(12) United States Patent
Dorman

(10) Patent No.: US 9,384,182 B2
(45) Date of Patent: *Jul. 5, 2016

(54) SYSTEMS, METHODS AND MACHINE READABLE MEDIUMS FOR DEFINING AND EXECUTING NEW COMMANDS IN A SPREADSHEET SOFTWARE APPLICATION

(71) Applicant: EXIGEN PROPERTIES, INC., Road Town, Tortola (VG)

(72) Inventor: Gregory Dorman, New York, NY (US)

(73) Assignee: Exigen Properties, Inc., Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 14/146,636

(22) Filed: Jan. 2, 2014

(65) Prior Publication Data

US 2015/0019945 A1 Jan. 15, 2015

Related U.S. Application Data

(63) Continuation of application No. 12/603,342, filed on Oct. 21, 2009, now Pat. No. 8,645,911.

(60) Provisional application No. 61/171,003, filed on Apr. 20, 2009.

(51) Int. Cl.
*G06F 9/44* (2006.01)
*G06F 17/24* (2006.01)
*G06F 9/455* (2006.01)
*G06Q 40/02* (2012.01)

(52) U.S. Cl.
CPC .......... *G06F 17/246* (2013.01); *G06F 9/45512* (2013.01); *G06Q 40/02* (2013.01)

(58) Field of Classification Search
None
See application file for complete search history.

(56) References Cited

U.S. PATENT DOCUMENTS

| 2003/0056181 | A1* | 3/2003 | Marathe | 715/538 |
| 2005/0188352 | A1  | 8/2005 | Jager et al. | |
| 2006/0095832 | A1  | 5/2006 | Serra et al. | |
| 2008/0034281 | A1  | 2/2008 | Handsaker et al. | |
| 2009/0044089 | A1* | 2/2009 | Gur et al. | 715/212 |

* cited by examiner

*Primary Examiner* — Elias Mamo
(74) *Attorney, Agent, or Firm* — Greenberg Traurig, LLP

(57) ABSTRACT

Systems, methods and machine-readable mediums for defining and executing new commands in a spreadsheet application are provided. A method may include receiving a declaration command in a first spreadsheet cell. The declaration command identifying a command name for the new command and operations performed for the command name based on a plurality of second spreadsheet cells. A system may include a processor programmed to evaluate the declaration command in the first spreadsheet cell according to the instructions stored in a storage device, receive the command name and at least two parameters identifying at least one input spreadsheet cell and at least one output spreadsheet cell of the spreadsheet application, create a new command for the spreadsheet application, and evaluate the new command as identified by the command name in a second spreadsheet cell for execution. The computer readable mediums provide instructions to cause the processor to perform the operations above.

20 Claims, 24 Drawing Sheets

| Borrower Current Summary- | | | | Terms- | | Example Data |
|---|---|---|---|---|---|---|
| Current Monthly Income | $ | 9,500 | | Orig Term / First Pay Date | | 360 |
| Current Debt Obligations | $ | 385 | | First Pay Date | | 1/1/2007 |
| Current Housing Ratio | | 37.7% | | Orig Maturity Date | | 12/1/2037 |
| Current Debt Ratio | | 45.8% | | Stated Remaining Term | | 335 |
| Current Total Debt | $ | 212,019.59 | | Late Charge Rate | | 5.000% |
| Current Debt to Income | | 7.88% | | Orig Balance | $ | 200,000.00 |
| | | | | Current Balance | $ | 197,938.65 |
| Outcome | | | | LPD | | 3/1/2008 |
| | | Approve | | Next Due | | 4/1/2008 |
| | | | | Current As of Date | | 12/1/2008 |
| | | | | Mos in arrears | | 8 |
| | | | | Days DQ | | 240 |
| | | | | Interest in Arrears | $ | 10,227 |
| | | | | Escrow Shortage | $ | 1875.25 |
| | | | | Suspense Balance | $ | 850.00 |
| | | | | Cumulative Late Charges | $ | 573.13 |
| | | | | Cumulative Fees | $ | 120.00 |
| | | | | Advances | $ | 50.00 |
| | | | | Current Rate | | 7.750% |
| | | | | Current P&I Payment | $ | 1,432.82 |
| | | | | Current T&I Payment | $ | 375.00 |
| | | | | Current Total Payment | $ | 1,807.82 |

| | Borrower Current Summary- | | | | Terms- | Example Data |
|---|---|---|---|---|---|---|
| | Current Tot Income | $ | 4,500 | | Orig Term / First Pay Date | 360 |
| | Current Debt Obligations | | 38% | | First Pay Date | 1/1/2007 |
| | Current Housing Ratio | | 37.7% | | Orig Maturity Date | 12/1/2037 |
| | Current Debt Ratio | | 45.8% | | Stated Remaining Term | 335 |
| | Current Total Debt | $ | 212,019.59 | | Late Charge Rate | 5.000% |
| | Current Debt to Income | | 7.88% | | Orig Balance | $ 200,000.00 |
| | | | | | Current Balance | $ 197,938.65 |
| | | | | | IPTD | 3/1/2008 |
| | Outcome | | | | Next Due | 4/1/2008 |
| | | | | | Current As of Date | 12/3/20XX |
| | | | | | Mos in arrears | 8 |
| | | | | | Days DQ | 240 |
| | | | | | Interest in Arrears | $ 10,227 |
| | | | | | Escrow Shortage | 1875.25 |
| | | | | | Suspense Balance | 850.00 |
| | | | | | Cumulative Late Charges | 573.13 |
| | | | | | Cumulative Fees | 120.00 |
| | | | | | Advances | 50.00 |
| | | | | | Current Rate | 7.750% |
| | | | | | Current P&I Payment | 1,432.82 |
| | | | | | Current T&I Payment | 375.00 |
| | | | | | Current Total Payment | $ 1,807.82 |

| | A | B | C | D | E | F | G |
|---|---|---|---|---|---|---|---|
| fx | | | =credit_rate(E8,F8) | | | | |
| 1 | | | | | | | |
| 2 | | | | | | | |
| 3 | | | | | | | |
| 4 | | | | | | | |
| 5 | | | | | | | |
| 6 | | | | | | | |
| 7 | | | Client Id | Name | Income | Debt | |
| 8 | | | 072-219 | Thurinus, Octavius | 4900 | 386 | =credit_rate(E8,F8) |
| 9 | | | 068-208 | Catilina, Julius Sergius | 5200 | 211 | |
| 10 | | | 102-314 | Flacca, Fulvia | 3200 | 890 | |
| 11 | | | 077-99A | Scipio, Cornelia | 6400 | 120 | |
| 12 | | | 963-173.3 | Magnus, Pompeus | 4960 | 970 | |
| 13 | | | 113-24 | Cato, Marcus Porcius | 9800 | 4300 | |

FIG. 4A

| | A | | C | D | E | F | G |
|---|---|---|---|---|---|---|---|
| 1 | | | | | | | |
| 2 | | | | | | | |
| 3 | | | | | | | |
| 4 | | | | | | | |
| 5 | | | | | | | |
| 6 | | | | | | | |
| 7 | | | | | | | |
| 8 | | | Client Id | Name | Income | Debt | |
| 9 | | | 072-219 | Thurinus, Octavius | 4900 | 386 | Accept |
| 10 | | | 068-208 | Catilina, Julius Sergius | 5200 | 211 | |
| 11 | | | 102-314 | Flacca, Fulvia | 3200 | 890 | |
| 12 | | | 077-99A | Scipio, Cornelia | 6400 | 120 | |
| 13 | | | 963-173.3 | Magnus, Pompeus | 4950 | 970 | |
| 14 | | | 113-24 | Cato, Marcus Porcius | 9800 | 4300 | |

FIG. 4B

| | B | C | D | E | F | G |
|---|---|---|---|---|---|---|
| | | | =Credit_RareIceHiClysarmA.E8:F8) | | | |
| 1 | | | | | | |
| 2 | | | | | | |
| 3 | | | | | | |
| 4 | | | | | | |
| 5 | | | | | | |
| 6 | | | | | | |
| 7 | | Client Id | Name | Income | Debt | |
| 8 | | 072-219 | Thurinus, Octavius | 4900 | 385 | Accept |
| 9 | | 068-208 | Catilina, Julius Sergius | 5200 | 211 | Accept |
| 10 | | 102-314 | Flacca, Fulvia | 3200 | 890 | Reject |
| 11 | | 077-99A | Scipio, Cornelia | 6400 | 120 | Accept |
| 12 | | 963-173.3 | Magnus, Pompeus | 4960 | 970 | Reject |
| 13 | | 113-24 | Cato, Marcus Porcius | 9800 | 4300 | Reject |

| | A | B | C | D | E | F | G | H | I |
|---|---|---|---|---|---|---|---|---|---|
| 13 | | | | | 1 | 2 | 3 | 4 | |
| 14 | | | Thurinus | Octavius | 44 main street | Cincinr | unknown | | |
| 15 | | 072-219 | Catilina | Julius Sergius | 13 west 20th | Nursery Gazard, | Coney Island Av | Rue Cherche Midi, Pa | |
| 16 | | 058-208 | Flacca | Fulvia | #N/A | #N/A | #N/A | #N/A | |
| 17 | | 102-314 | Scipio | Cornelia | #N/A | #N/A | #N/A | #N/A | |
| 18 | | 077-99A | Magnus | Pompeus | somewhere in DC | New York | #N/A | #N/A | |
| 19 | | 963-173.3 | Cato | Marcus Porcius | NJ Main | Metro | #N/A | #N/A | |
| 20 | | 113-24 | | | | | | | |

FIG. 17

| | Client Id | Name | Income | Debt | | |
|---|---|---|---|---|---|---|
| | 072-219 | Thurinus, Octavius | 4900 | 386 | Accept |
| | 068-208 | Catilina, Julius Sergius | 5200 | 211 | Accept |
| | 102-314 | Flacca, Fulvia | 3200 | 890 | Reject |
| | 077-99A | Scipio, Cornelia | 6400 | 120 | Accept |
| | 963-173.3 | Magnus, Pompeus | 4950 | 970 | Reject |
| | 113-24 | Cato, Marcus Porcius | 9800 | 4300 | Reject |

FIG. 18

| | B | C | D | E | F | G |
|---|---|---|---|---|---|---|
| | | fx | =current_debt(C13) | | | |
| 6 | | | | | | |
| 7 | | Client Id | Name | Income | Debt | |
| 8 | | 072-219 | Thurinus, Octavius | 4900 | 386 | Accept |
| 9 | | 068-208 | Catilina, Julius Sergius | 5200 | 211 | Accept |
| 10 | | 102-314 | Flacca, Fulvia | 3200 | 890 | Reject |
| 11 | | 077-99A | Scipio, Cornelia | 6400 | 120 | Accept |
| 12 | | 963-173.3 | Magnus, Pompeus | 4960 | 970 | Reject |
| 13 | | 113-24 | Cato, Marcus Porcius | 9800 | 4300 | Reject |

SYSTEMS, METHODS AND MACHINE READABLE MEDIUMS FOR DEFINING AND EXECUTING NEW COMMANDS IN A SPREADSHEET SOFTWARE APPLICATION

RELATED APPLICATIONS

The present application is a continuation application of U.S. patent application Ser. No. 12/603,342, filed Oct. 21, 2009 and entitled "Systems, Methods and Machine Readable Mediums for Defining and Executing New Commands in a Spreadsheet Software Application", which claims the benefit of and priority to Prov. U.S. Pat. App. Ser. No. 61/171,003, filed Apr. 20, 2009, the contents of which are hereby incorporated herein by reference in their entirety.

BACKGROUND

This disclosure relates to executing functions and more particularly relates to systems, methods and machine-readable mediums for defining and executing new commands in a spreadsheet software application.

SUMMARY OF THE DESCRIPTION

Systems, methods and machine readable mediums for defining a new command in a spreadsheet application are disclosed. The method may include receiving a declaration command in a first spreadsheet cell. The declaration command identifies a command name for the new command and operations performed for the command name based on a plurality of second spreadsheet cells. In one embodiment, the method may further include translating the command declared in a spreadsheet language to a fragment of code in a predetermined programming language. The method may include receiving the command name and at least two parameters in the first spreadsheet cell. The at least two parameters identifying the plurality of second spreadsheet cells. The plurality of second spreadsheet cells includes at least one input cell to receive at least one input parameter of the new command and at least one output cell to provide a return result of the new command.

In one embodiment, the declaration command may be programmed to cause the processor 20 to receive the command name from a third spreadsheet cell, receive a parameter to identify an input cell for the new command in a fourth spreadsheet cell, and receive a parameter to identify an output cell for the new command in a fifth spreadsheet cell.

The computer readable mediums provide instructions to cause the processor to perform the operations above. In one embodiment, the computer readable medium has stored thereon a set of instructions, which when executed by a computer having a processor and a memory, causes the computer to receive a declaration command in a first spreadsheet cell of a spreadsheet application. The declaration command defining a command name as a new command callable in a second spreadsheet cell.

In one embodiment, a system for executing a new command in a spreadsheet application is provided. The system may include a storage device and a processor. The storage device may be used to store code instructions for implementing a declaration command for assigning, in the spreadsheet application, a command name as the new command with at least two parameters. The processor may be programmed to receive code instructions for invoking the declaration command in a first spreadsheet cell, and receive the command name and the at least two parameters. The at least two parameters associated with input and output spreadsheet cells. The processor may also be programmed to assign the at least two parameters to the command name, and execute code instructions for invoking the command name in a second spreadsheet cell to execute the new command based on the at least two parameters.

In another embodiment, the system may include a storage device to store instructions for implementing a declaration command. The declaration command assigning a command name as the new command with at least two parameters. The system may also include a processor programmed to evaluate the declaration command in a first spreadsheet cell according to the instructions stored in the storage device, receive the command name and at least two parameters identifying at least one input spreadsheet cell and at least one output spreadsheet cell of the spreadsheet application, and create a new command for the spreadsheet application. The processor may then evaluate the new command as identified by the command name in a second spreadsheet cell by receiving data from the at least one input spreadsheet cell and providing data to the at least one output spreadsheet cell.

DRAWINGS

The above-mentioned features and objects of the present disclosure may become more apparent with reference to the following description taken in conjunction with the accompanying drawings wherein like reference numerals denote like elements and in which:

FIG. 2 illustrates a spreadsheet with a computation model for assessing a customer's credit risk based on that customer's income and debt obligations.

FIG. 3 illustrates a spreadsheet implementing a declaration command to define a new command in a spreadsheet application, according to one embodiment of the present disclosure.

FIG. 4A illustrates using a new command defined in a spreadsheet application, according to one embodiment of the present disclosure.

FIG. 4B illustrates an output result of a new command, according to one embodiment of the present disclosure.

FIG. 8 illustrates using the new command, defined in FIG. 3, for multiple spreadsheet cells, according to one embodiment of the present disclosure.

FIG. 9 illustrates an exemplary user-defined data model, according to one embodiment of the present disclosure.

FIG. 10 illustrates a spreadsheet implementing a declaration command to define a new command as a database for retrieving data, according to one embodiment of the present disclosure.

FIG. 11 illustrates an exemplary spreadsheet with populated data, according to one embodiment of the present disclosure.

FIG. 12 illustrates a callable new command LAST_NAME in a spreadsheet application, according to one embodiment of the present disclosure.

FIG. 13 illustrates a callable new command FIRST_NAME in a spreadsheet application, according to one embodiment of the present disclosure.

FIG. 15 illustrates utilizing the new commands for FIRST_NAME and LAST_NAME in a plurality of spreadsheet cells and calling a new command ADDRESS_HISTORY in a spreadsheet application, according to one embodiment of the present disclosure.

FIG. 16 illustrates utilizing the new command ADDRESS_HISTORY in a plurality of spreadsheet cells, according to one embodiment of the present disclosure.

FIG. 17 illustrates utilizing the new command ADDRESS_HISTORY in a plurality of spreadsheet cells, according to one embodiment of the present disclosure.

FIGS. 18-20 illustrate using new commands for a person's income and debt to populate the spreadsheet, according to an embodiment of the present disclosure.

FIG. 21 illustrates a callable new command for a static table, according to an embodiment of the present disclosure.

FIG. 22 illustrates retrieving a value from the table using the new command, according to an embodiment of the present disclosure.

DETAILED DESCRIPTION

In the description that follows, the present inventions may be described in reference to one or more embodiments that facilitates user friendly interface for programming in a spreadsheet. The present inventions, however, are not limited to any particular application nor is it limited by the examples described below. Various modifications to the disclosed embodiments may be apparent to those skilled in the art and the general principles defined herein may be applied to other embodiments and applications without departing from the spirit and scope of the inventions. Therefore, the description of the embodiments that follow are for purposes of illustration and not limitation.

Figure 1:
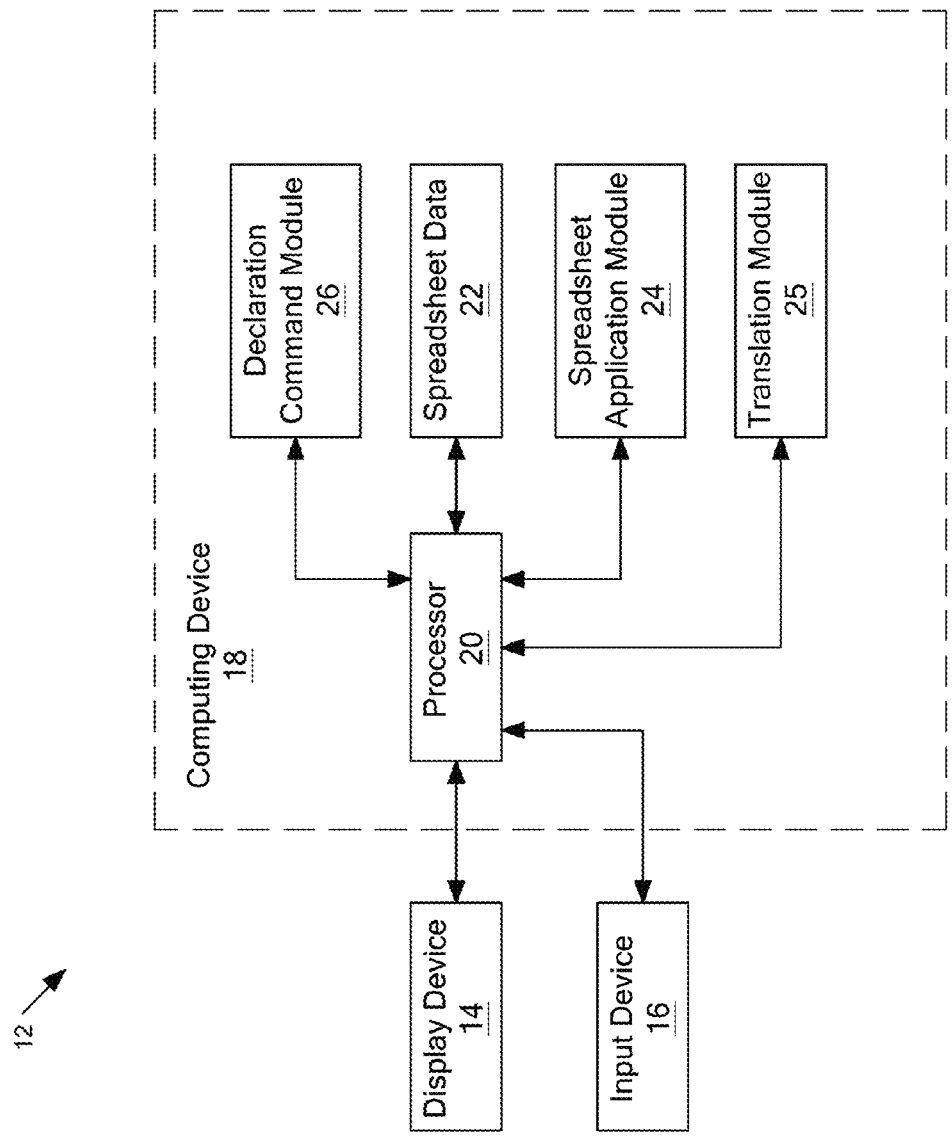
FIG. 1 illustrates an exemplary block diagram of a system to facilitate programming in a spreadsheet application, according to one embodiment of the present disclosure.

FIG. 1 illustrates an exemplary block diagram of a system 12 to facilitate programming in a spreadsheet application, according to one embodiment of the present disclosure. The system 12 may include a display device 14, an input device 16, and a computing device 18. The spreadsheet application may, for example, be a Microsoft Excel® spreadsheet or the like, that is executable via the computing device 18.

The display device 14 may be communicatively coupled to the computing device 18 to display the spreadsheet. In one embodiment, the display device 14 may be a desktop monitor or a handheld screen. The input device 16 may also be communicatively coupled to the computing device 18 to input data or commands in the spreadsheet, and/or select one or more user interfaces of modules operative with the spreadsheet for execution. In one embodiment, the input device 16 may be a keyboard and/or a computer mouse. As can be appreciated, the display device 14 may be integrated with the input device 16 as in the case with a touch-screen device.

As can be appreciated, the computing device 18 may include one or more processors 20 for implementing one or more functional modules, such as a spreadsheet application module 24, a translation module 25 and a declaration command module 26. As used herein, the term module refers to logic implemented in hardware and/or software. It may include a collection of software instructions, possibly having entry and exit points, written in a programming language, such as, for example, Java, Microsoft Visual Basic® or C++. A software module may be compiled and linked into an executable program, or installed in a dynamic link library, or may be written in an interpretive language such as Java. It may be appreciated that software modules may be callable from other modules, and/or may be invoked in response to detected events or interrupts. Software instructions may be embedded in firmware, such as an EPROM. It may be further appreciated that hardware modules may be comprised of connected logic units, such as gates and flip-flops, and/or may be comprised of programmable units, such as programmable gate arrays. The modules described herein are preferably implemented as software modules, but could be represented in hardware or firmware.

In one embodiment, each module is provided as a modular code object, where the code objects typically interact through a set of standardized function calls. In one embodiment, the code objects are written in a suitable software language such as Java or C++, but the code objects can be written in any low level or high level language. In one embodiment, the code modules are implemented in Java and compiled on a computing device 18 running a spreadsheet application. Alternatively, the code modules can be compiled with their own front end on a kiosk, or can be compiled on a cluster of server machines and transmitted through a cable, packet, telephone, satellite, or other telecommunications network. Artisans of skill in the art may recognize that any number of implementations, including code implementations directly to hardware, are also possible.

The computing device 18 may also include a storage device, such as a database for storing data including spreadsheet data 22. As is understood by a person skilled in the art, the spreadsheet data may include content information in one or more spreadsheet cells. As is well known, database categories can be combined, further divided or cross-correlated, and any combination of databases and the like can be provided from within the computing device 18. In one embodiment, any portion of the database can be provided externally from the computing device 18, either locally or remotely over a network. The external data from an external database can be provided in any standardized form which the processor 20 can understand. For example, an external database at a provider can advantageously provide end-user data in response to requests from the processor 20 in a standard format, such as, for example, name, user identification, and computer identification number, and the like, and the end-user data blocks are transformed into a function call format which the code modules can understand.

As can be appreciated, the database may be used to store, arrange and retrieve data including instructions for implementing a declaration command. The declaration command may be used to assign, in the spreadsheet application, a command name as a new command with at least two parameters. The database may be a storage device such as a machine-readable medium, which may be any mechanism that provides (i.e. stores and/or transmits) information in a form readable by a processor. For example, the machine-readable medium may be a read only memory (ROM), a random access memory (RAM), a cache, a hard disk drive, a floppy disk drive, a magnetic disk storage media, an optical storage media, a flash memory device or any other device capable of storing information. Additionally, machine-readable medium may also comprise computer storage media and communication media. Machine-readable medium includes volatile and non-volatile, removable and non-removable media implemented in any method or technology for storage of information such as computer-readable instructions, data structures, program modules or other data. Machine-readable medium also includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by a computer.

The spreadsheet application module 24 may be provided as a modular code object interacting through a set of standardized spreadsheet function calls. The spreadsheet application module 24 may be used to transmit and retrieve data such as the spreadsheet data 22. The spreadsheet application module 24 may be operatively associated with one or more modules, for example, the declaration command module 26 to perform a set of functional calls. The declaration command module 26 may provide code instructions for implementing a declaration command to assign a command name as a new command with at least two parameters. The declaration command module may be an add-on module to a spreadsheet application program, or an integrated part of the spreadsheet program. The spreadsheet application module 24 may also be operatively associated with the translation module 25 to translate the spreadsheet data 22 into a piece of code in a programming language.

In one embodiment, the processor 20 may be configured, programmed and/or provided code instructions from one or more modules to facilitate programming, define a new command and execute the new command in a spreadsheet application. For example, the processor 20 may be programmed to receive code instructions for invoking the declaration command in a first spreadsheet cell and to receive the command name and the at least two parameters. The at least two parameters are associated with input and output spreadsheet cells. The processor 20 may be further programmed to assign the at least two parameters to the command name, and execute code instructions for invoking the command name in a second spreadsheet cell to execute the new command based on the at least two parameters.

In one embodiment, the translation module 25 may be configured or programmed to translate the logic of the declared function into a source code in a predetermined programming language.

In another embodiment, the processor 20 may be configured, programmed and/or provided code instructions to evaluate the declaration command in a first spreadsheet cell according to the instructions stored in the storage device, receive the command name and at least two parameters identifying at least one input spreadsheet cell and at least one output spreadsheet cell of the spreadsheet application, and create a new command for the spreadsheet application. The processor 20 may also be configured, programmed and/or provided code instructions to then evaluate the new command as identified by the command name in a second spreadsheet cell by receiving data from the at least one input spreadsheet cell and providing data to the at least one output spreadsheet cell.

As is understood by persons skilled in the art, a conventional spreadsheet recognizes either a "built-in" function created by the manufacturer of the spreadsheet application, or a "user-written function" whose construction would require development of its logic in a software language by a software engineer, and not in the spreadsheet language by the non software specialist user of the spreadsheet model.

FIG. 2 illustrates a spreadsheet with a computation model for assessing a customer's credit risk based on that customer's income and debt obligations. A conventional spreadsheet language would limit the answer to one customer at a time, computing the outcome once for each newly entered combination of income and debt. To implement the computation model for multiple customers at a time, a new command callable in one or more spreadsheet cells may be required. The new command may take "income" and "debt" as parameters from a customer spreadsheet data 22. The output result would be stored in the database and/or presented to a credit officer.

FIG. 3 illustrates a spreadsheet implementing a declaration command to define a new command in a spreadsheet application, according to one embodiment of the present disclosure. As shown in FIG. 3, the declaration command OL_DECLARE_FUNCTION is specified as the content of cell C1. The content of the cell indicates that a new command named "Credit_Rate" is declared; and the new command would use the cells D5 and D6 to accept inputs in the spreadsheet, update the spreadsheet according to the formulae coded in the spreadsheet, and take the result of cell D12 as the output of the new command. The declaration command (e.g., OL_DECLARE_FUNCTION) is callable in the cell C1 to declare the command Credit_Rate. After the declaration command is evaluated in the cell (e.g., C1), the declared function (e.g., Credit_Rate) will be a callable function in the spreadsheet application, with the user specified name (e.g., Credit_Rate). The declared function can be evaluated via taking Income and Debit as parameters to cells D5 and D6, updating the spreadsheet, and returning as a result the Outcome as obtained in cell D12 of the spreadsheet using the computation logic implemented in the spreadsheet. As can be appreciated, the new command named Credit_Rate may now be a callable spreadsheet function of at least two parameters. Credit_Rate may be callable in the same manner as any other "built-in" function created by the manufacturer of the spreadsheet application.

In one embodiment, the declaration command may be programmed to provide instructions to the processor 20 to receive the command name from a third spreadsheet cell. The declaration command may also be programmed to provide instructions to the processor 20 to receive a parameter to identify an input cell for the new command in a fourth spreadsheet cell, and receive a parameter to identify an output cell for the new command in a fifth spreadsheet cell.

FIG. 4 illustrates using a new command defined in a spreadsheet application, according to one embodiment of the present disclosure. As shown in FIG. 4, the new command Credit_Rate is entered in cell G8 along with the parameters for Income and Debt respectively of customer Octavius Thurinus. The ID, name, Income and Debt for this customer appears in cells C8, D8, E8 and F8 respectively. The formula in Cell G8 indicates that the input parameters are the values in the cells E8 and F8. Thus, when the formula in Cell G8 is evaluated, the new command Credit_Rate is evaluated by copying the values to Cells D5 and D6 of the spreadsheet in FIG. 3, updating the result in Cell D12 of FIG. 3 using the computation logic coded in the spreadsheet in FIG. 3, and obtaining the result value from the Cell D12 as the evaluated result of the formula in Cell G8 of FIG. 4. FIG. 4B illustrates the output result of the new command, according to one embodiment of the present disclosure.

As can be appreciated, the declaration command may be implemented as an add-on module to the spreadsheet application module 24, or integrated with spreadsheet application module 24. In the add-on module implementation, the new command Credit_Rate may be created and enabled for invocation in the user's spreadsheet by means of a standard API published by the manufacturer of the spreadsheet product. For example, the declaration command may follow the rules and satisfies the constraints defined for the category "user defined" by Microsoft Corporation, published in Microsoft Office Excel 2007 Developer Reference, and incorporated herein by reference.

Figure 5:
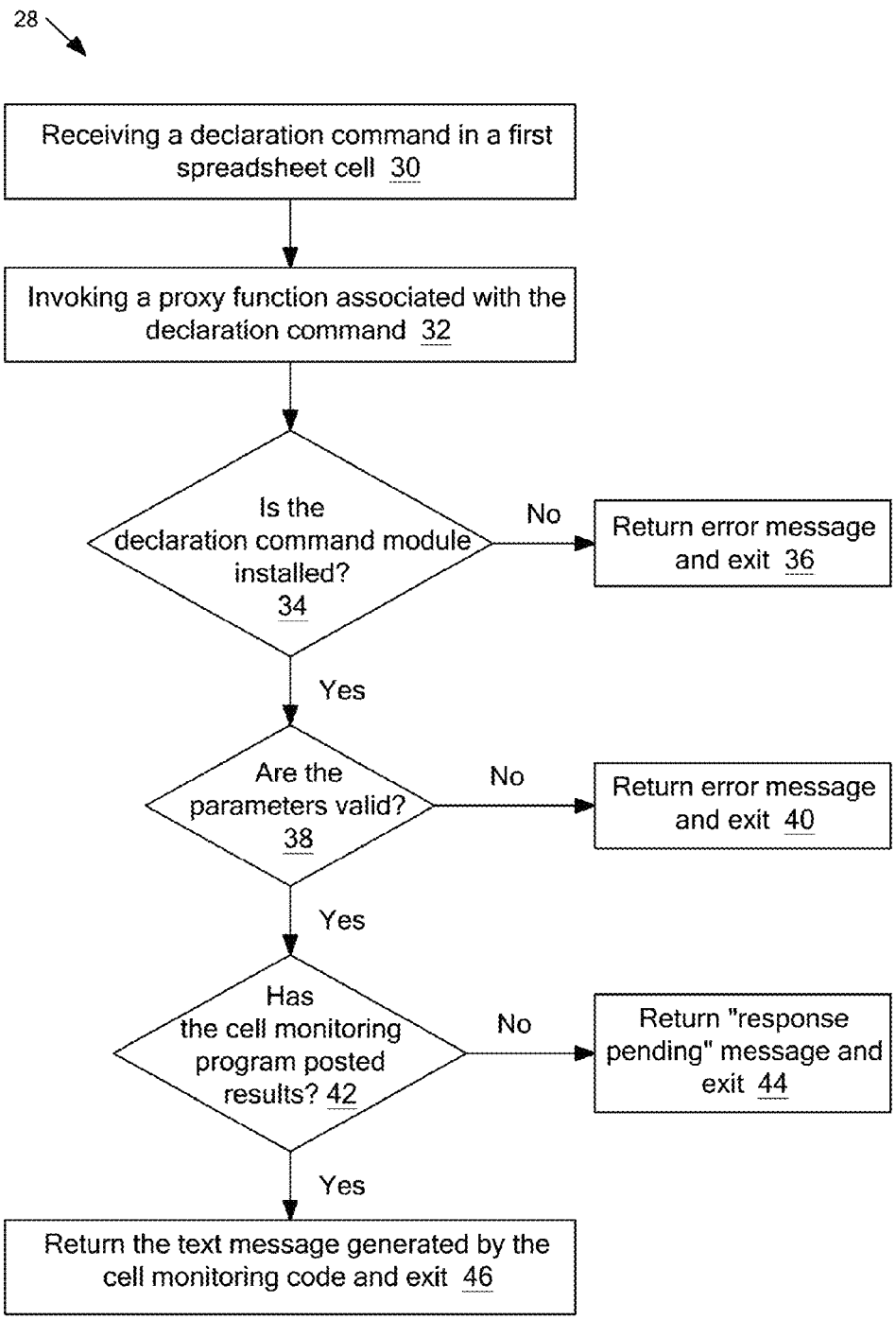
FIG. 5 is a flow diagram illustrating the processing of a declaration command and proxy, according to one embodiment of the present disclosure.

FIG. 5 is a flow diagram 28 illustrating the processing of a declaration command and proxy, according to one embodiment of the present disclosure. As can be appreciated, the processor 20 may be programmed with code instructions to define a new command, which may then be available for user invocation in the spreadsheet application. The processor 20 receives a declaration command in a first spreadsheet cell (30). As noted above, the declaration command identifies a command name for the new command and operations performed for the command name based on a plurality of second spreadsheet cells. The plurality of spreadsheet cells may include at least one input cell to receive at least one input parameter of the new command and at least one output cell to provide a return result of the new command.

Next, the processor 20 invokes a proxy function associated with the declaration command, according to an embodiment of the present disclosure (32). The proxy function is called to perform the operations 38-46 for the installation of a user defined function to implement the command declared by the declaration command. For example, the external source may be a Java script source or any other source utilizing a predetermined programming language.

Once the proxy function is invoked, the processor 20 may then determine if the declaration command module 26 is installed (34). If the declaration command module 26 is not installed, the processor 20 prompts an error message and terminates the proxy function (36). If the declaration command module 26 is installed, then the processor 20 evaluates if the parameters provided are valid (38). If the parameters are invalid, the processor 20 prompts an error message and terminates the proxy function (40). If the parameters are valid, then the processor 20 evaluates if a cell monitoring code/module posted a result (42). The cell monitoring code/module performs appropriate actions for the implementation of the new command when any spreadsheet cell(s) is/are changed by the user. When the user enters the declaration command in a cell, the proxy function and the cell monitoring code/module separately invoked by the spreadsheet. If no result has been posted from the cell monitoring code/module, the processor 20 prompts a "response pending" message and terminates the proxy function (44). If a result has been posted from the cell monitoring code/module, the processor 20 provides the text message generated by the cell monitoring code/module and terminates the proxy function (46).

Figure 6:
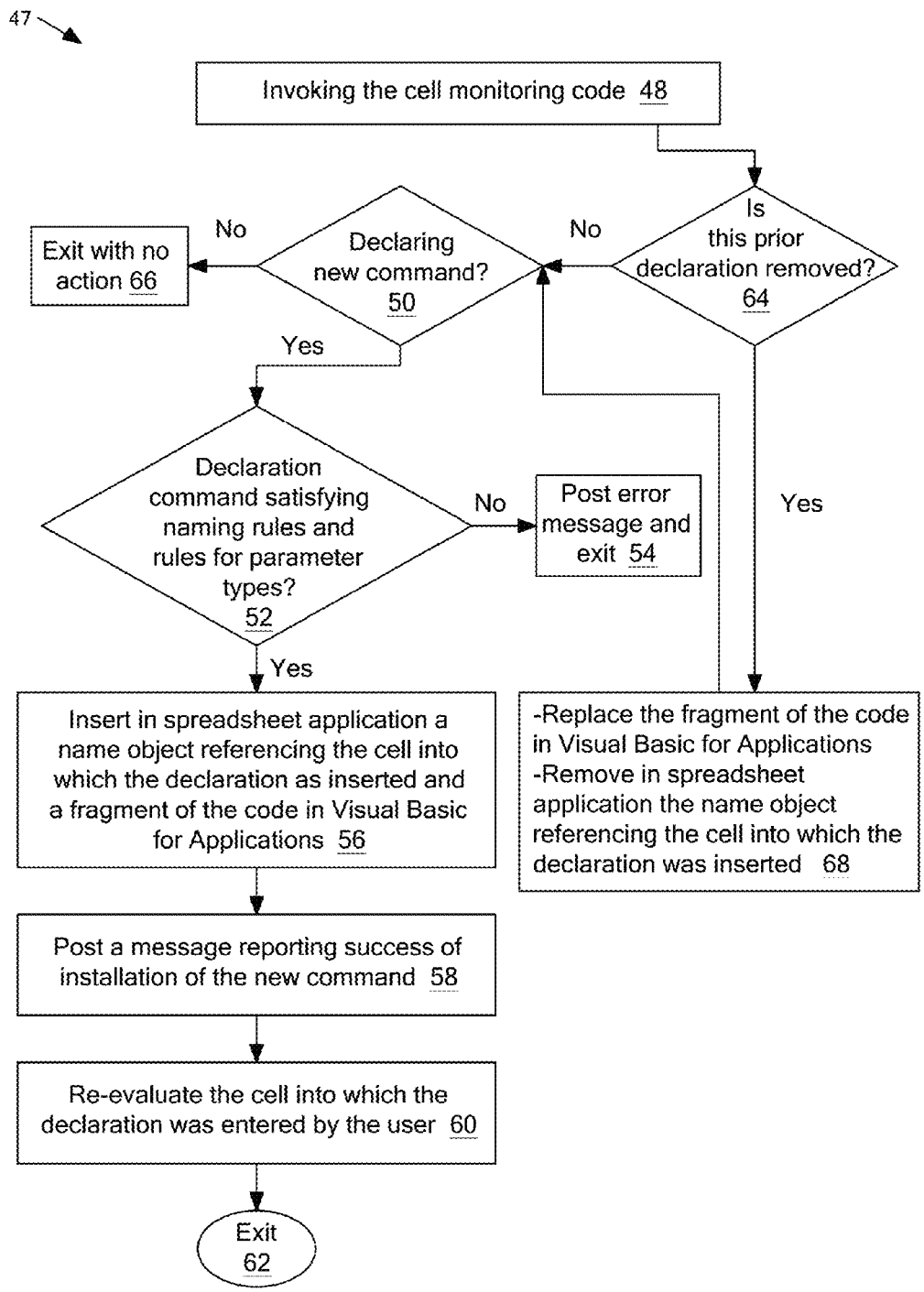
FIG. 6 is a flow diagram illustrating an evaluation of a spreadsheet cell content using a cell monitoring code, according to one embodiment of the present disclosure.

FIG. 6 is a flow diagram 47 illustrating an evaluation of a spreadsheet cell content using a cell monitoring code, according to one embodiment of the present disclosure. As can be appreciated, the processor 20 may be programmed with the cell monitoring code to automatically monitor change in cell content. In light of a command declaration, the processor 20 invokes the cell monitoring code/module (48). The processor 20 may be programmed to evaluate if a prior declaration is removed (64).

If the command declaration was a removed prior declaration, the processor 20 replaces the fragment of the code in Visual Basic for Applications and removes, in the spreadsheet application, the Name object referencing the cell into which the declaration was inserted (68). The processor 20 may then determine if a new command is declared (50). Similarly, if the command is not a removed prior declaration, the processor 20 determines if a new command is declared (50). If it is not a new command, the processor 20 terminates cell monitoring with no action (66).

Alternatively, if a new command is declared, the processor 20 evaluates if the declaration command satisfies naming and parameter rules (52). For example, in one embodiment, the declaration command invoked in a spreadsheet cell should include, in brackets and/or quotation marks, a function name in double quotes, followed by a comma, followed by the output cell address, followed by another comma, followed by at least one input cell address to be used as input parameters.

If the declaration command does not satisfy the naming and parameter rules, the processor 20 prompts an error message and terminates cell monitoring (54). If the declaration command satisfies the naming and parameter rules, the processor 20 may be programmed to insert in the spreadsheet application a Name object referencing the cell into which the declaration was inserted, and a fragment of the code in Visual Basic for Applications (56). The processor 20 may also post a message reporting success of installation of the new command (58), re-evaluate the cell into which the declaration was entered by the user (60) and terminate the operations of the cell monitoring code/module (62).

When a user invokes the new command, the automatically generated code for the new command may cause the processor 20 to perform the following operations. First, the processor 20 may be programmed to cause the movement or a copy of the input parameters (in the above example cells E4 and F4 of FIG. 4) into the proper place of in the spreadsheet which contains function's logical definition (in this case into cells D5 and D6 of FIG. 3). The processor 20 may then cause the spreadsheet in FIG. 3 to perform any calculations in the event that the spreadsheet itself invokes other functions. The internal processing may perform similar operations on all of them, recursively and until all of the downstream functions complete their calculations. It may then take the output parameter (in this case cell D12 of FIG. 3) and return that as a return value of the CREDIT_RATE function to be displayed to the user. It may do such conversion of the datatypes as is dictated by the spreadsheet. In the case of Excel®, it may return all values as VARIANT types with the STRING, NUMBER, and DATE set in accordance with the format defined by the user for the cell in which he/she wishes to see the output.

Figure 7:
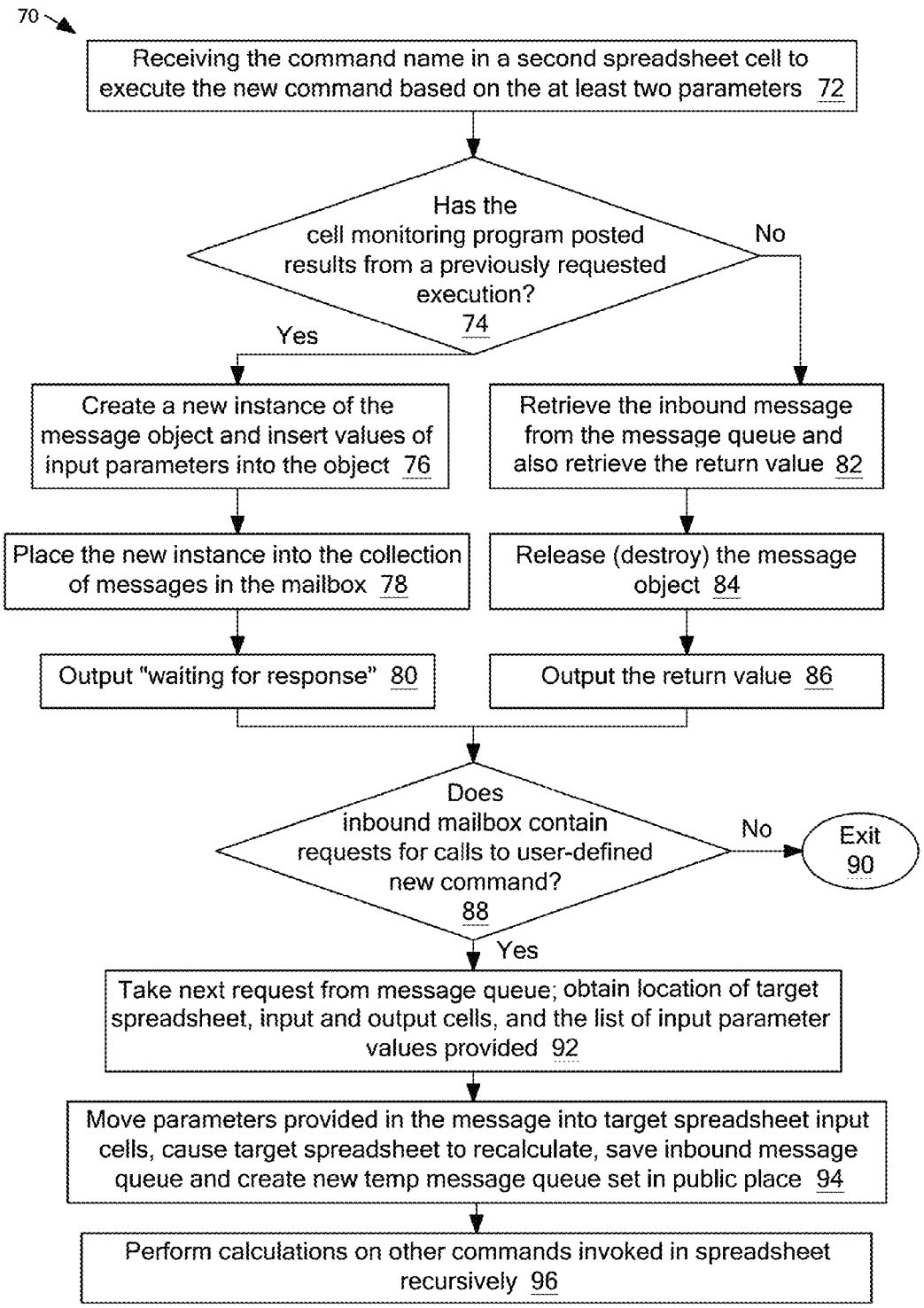
FIG. 7 is a flow diagram illustrating a call for execution of a new command, according to one embodiment of the present disclosure.
Figure 14:
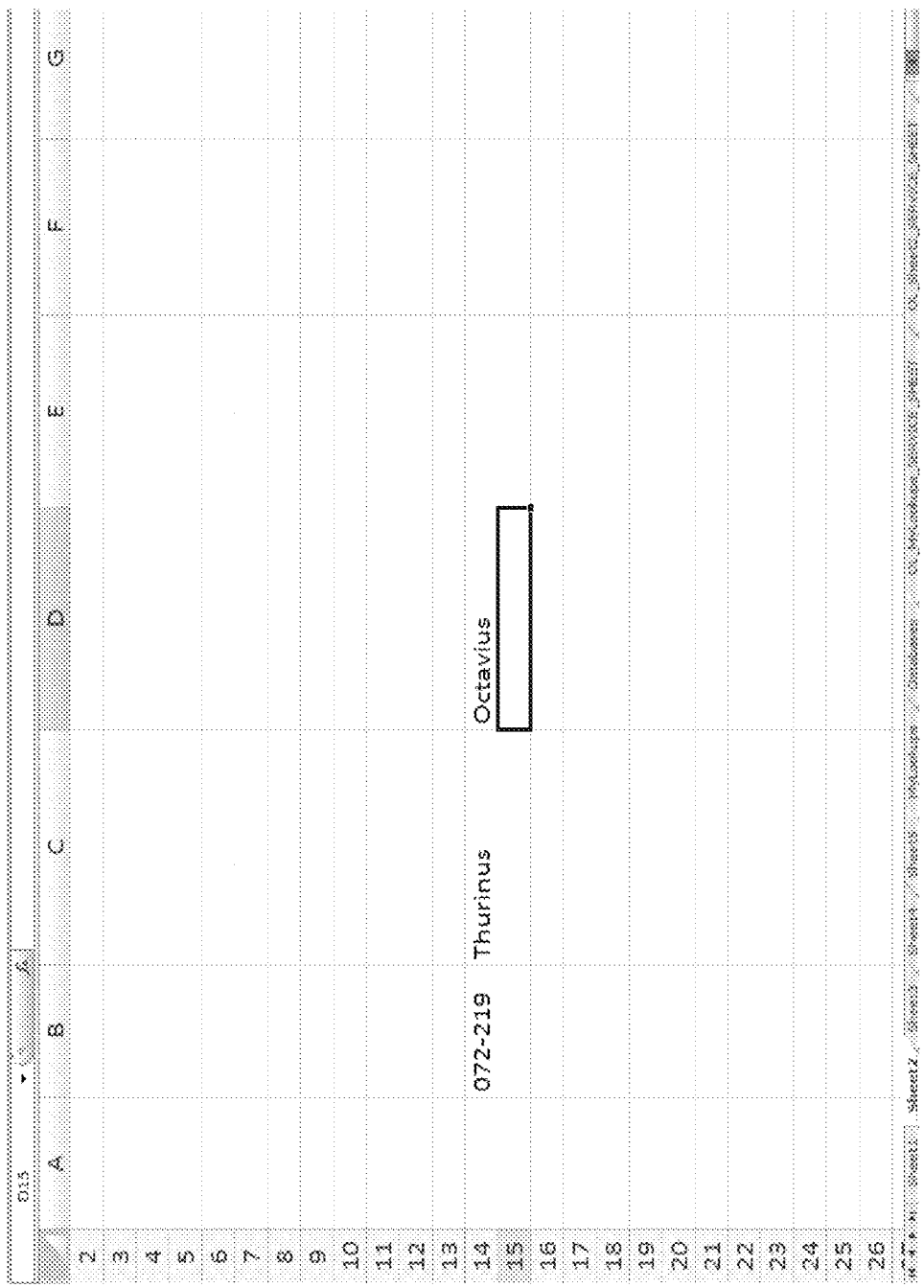
FIG. 14 illustrates the result from invoking the new command of FIG. 13, according to one embodiment of the present disclosure.

FIG. 7 is a flow diagram 70 illustrating a call for execution of a new command, according to one embodiment of the present disclosure. As can be appreciated, the processor 20 may be programmed with code instructions to call the user-defined new command. The processor 20 receives the command name in a second spreadsheet cell to execute the new command based on at least two parameters (72). The new command can also be called under other conditions, such as when the user enters new or modifies an existing command containing the new command name which he previously declared, when the user modifies the value of one or more of the parameters of the new command, when the user modifies a cell which is a member of "dependent" cell chain that includes one or more cells invoking new command(s) defined by the user, etc.

Next, the processor 20 calls the new command and evaluates if the cell monitoring code/module posted results from a previously requested execution (74). In one embodiment, it may be assumed that if the cell monitoring code/module posted results from a previously requested execution, the reason for the call was not to receive a response to the previously requested execution. As such, the processor 20 may be programmed to create a new instance of the message object and insert values of input parameters into the object (76). The processor 20 may then place the new instance into the collection of messages in a "mailbox" that contains all outbound requests from all functions of this type from all active spreadsheets invoked by the call of the new command (78). The processor 20 may also output a "waiting for response" message (80).

In one embodiment, it may be assumed that if the cell monitoring code/module did not post results from a previously requested execution, the reason for the call was to receive the response to the previously requested execution. As such, the processor 20 may be programmed to retrieve the inbound message from the message queue and retrieve the return value (82). The processor 20 may then release or destroy the message object (84) and output the return value (86).

Next, the processor 20 may be programmed to evaluate the inbound mailbox to determine if it contains requests for calls to a user-defined new command (88). If not, then the processor 20 terminates evaluation of the inbound mailbox (90). If the inbound mailbox contains requests for calls to a user-defined new command, the processor 20 may be programmed to take the next request from the message queue, and obtain the location of the target spreadsheet, input and output cells, and the list of input parameter values provided (92). As explained above, the processor 20 may also move parameters provided in the message into the target spreadsheet input cells, cause the target spreadsheet to recalculate, save inbound message queue and create new temporary message queue set in a public place so that all subsequent requests may be deposited there (94). Next, the processor 20 may recursively perform calculations on other commands invoked in the spreadsheet (96). The processor 20 may then re-evaluate inbound mailbox to determine if the other commands invoked contain requests for calls to a user-defined new command.

FIG. 8 illustrates using the new command, defined in FIG. 3, for multiple spreadsheet cells, according to one embodiment of the present disclosure. In a classic expression of spreadsheet, the user can now copy the function call across a range of data, and without any outside assistance, obtain an entire series of calculated results in rows 9 through 13 of column G of FIG. 8. The spreadsheet application, such as Excel®, may automatically adjust parameter references of rows 9 through 13. It may invoke CREDIT_RATE function for each row, in the sequence that it deems to be optimal. For each such invocation, the called function may repeat the operation described above. The returned value may then be rendered by the spreadsheet application in the cell where the new command has been defined, without any further interference from the function code or the user.

As can be appreciated, the scope of the new command created in this manner may not be limited to the spreadsheet in which it was declared (i.e. the function can be called directly, without any further qualifications from any spreadsheet, and that same name can be used in two different spreadsheets without mutual interference). Furthermore, the processor 20 may be programmed to automatically monitor the new command's logic once it has been declared and activated for use. If the user changes a formula in the spreadsheet which is contained in an input or output cell and identified as a parameter of the new command, the processor 20 may be programmed to detect the changes (i.e. changes which could potentially produce different result than the one obtained from the last call even if the same exact input parameters were used). Once such change is detected, the processor 20 may be programmed to perform "recalculate" operation on all cells which contain the reference to the new command.

As is understood by a person skilled in the art, declaring a new command in a spreadsheet application may be utilized in retrieving data from a DATABASE or a static TABLE, expressing an IF-THEN-ELSE sequence, and creating new LOOPS in the spreadsheet application.

One of the biggest challenges facing a spreadsheet application user is the ability to organize data in a way that would permit an automatic translation of reference between the spreadsheet and the real database. While the spreadsheet keeps data in tables of rows and columns, the software applications keep the data in databases (originally indexed files such as IMS and VSAM, later relational database such as DB2, Informix or Oracle). State-of-the-art technology for keeping application data today are relational databases with an "object model" superimposed over it, using an MDA (Model Driven Architecture) techniques and popular products such as Hybernate.

There are multiple solutions and tools which extract data from databases and populate the spreadsheets. In most cases, however, the original data model which implements a potentially complex interrelationship between data elements is not propagated into the spreadsheet, making a translation of the logic from spreadsheet into the working application impossible.

One embodiment of the present disclosure introduces a full concept of the data object and of object model into the spreadsheet language. It calls for creation of an in-memory object database which would fully mimic the structure of the application data model except for its application-related methods. The in-memory replica may be populated with the extract of the application's database when developing a component of the existing application, and by the spreadsheet directly if developing a brand new application. The fields (properties) of the replica may be available to all spreadsheet calculations, including any user defined functions, as discussed above.

FIGS. 9 through 20 illustrate using a new command defined in a spreadsheet application for retrieving data from a spreadsheet database, according to an embodiment of the present disclosure. While the example covers the use case of a new application being developed, hence the data model being designed fresh, the disclosure may also apply to cases when a component of the previously existing application is under construction. In the latter case, the instance of the data model expressed in the enhanced spreadsheet language may be automatically generated from the application's object model coded in the application's preferred language (Java, C++, C#, etc).

FIG. 9 illustrates an exemplary user-defined data model (in the case of developing an additive application component this model may be automatically extracted from the targeted application). As an example, the model may be a series of rows 6 through 84, and columns B through F placed into the spreadsheet. The model may have all the logical capabilities which exist in real life object models: arbitrary complex datatypes, nested collections and arrays, references, subtypes, references, etc. In this specific syntactical expression, the column indent indicates that the group of fields has many-to-one relationship to the prior group, as for example: the object "person" is a collection of objects, each having fields such as CID, Last Name, First Name, etc. Each of these, has a collection of Schools, another collection of Summer Schools, yet another called Address History, as well as Friends. Each member of Friends collection is also a Person (i.e. has same field attributes, CID, Last Name, etc).

Figure 10:
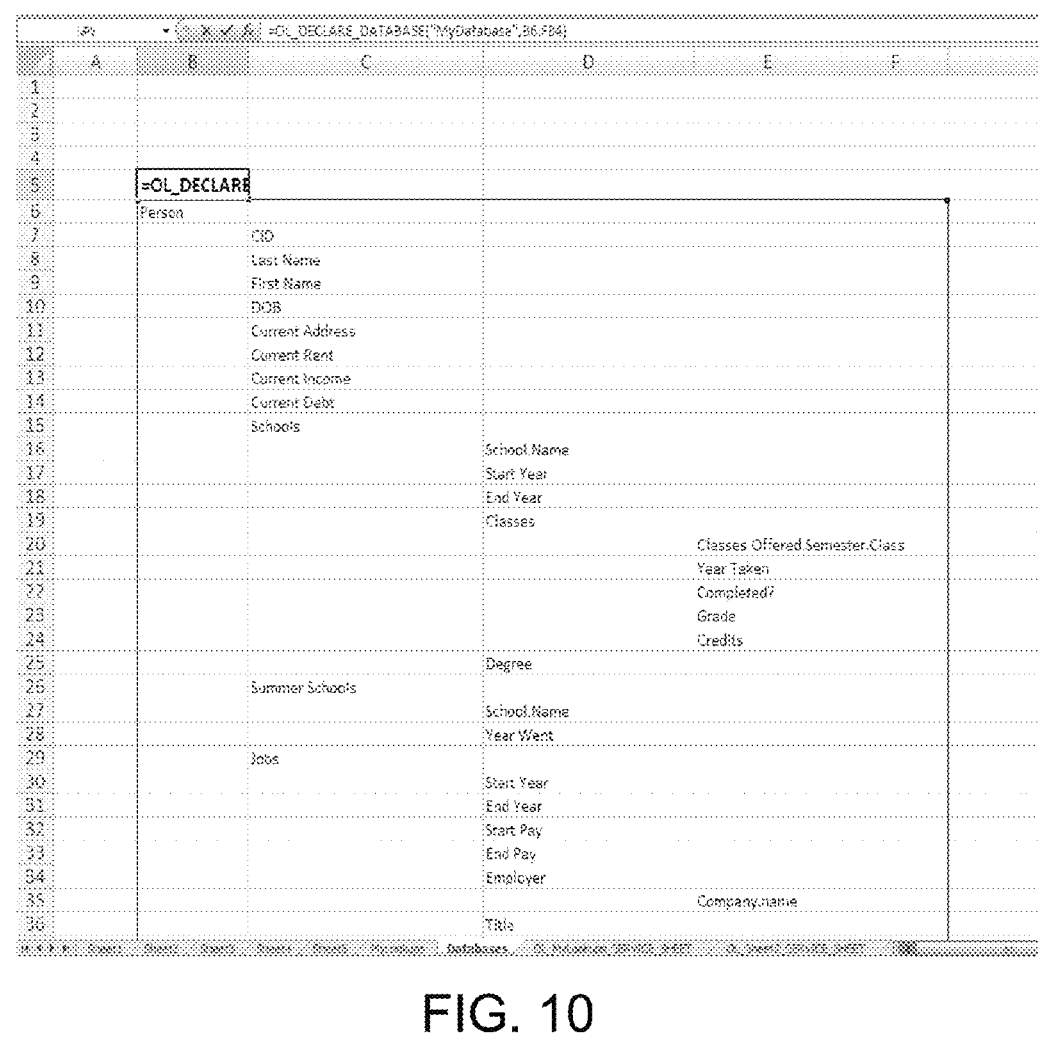

A declaration command, shown in FIG. 10 as a DECLARE DATABASE command, may be used to activate the model described in the spreadsheet. FIG. 10 illustrates a spreadsheet implementing a declaration command to define a new command as a database for retrieving data, according to one embodiment of the present disclosure. In this example, the cell range of B6 to F84 is identified as a parameter to the new command to provide the entire set of data.

Figure 11:
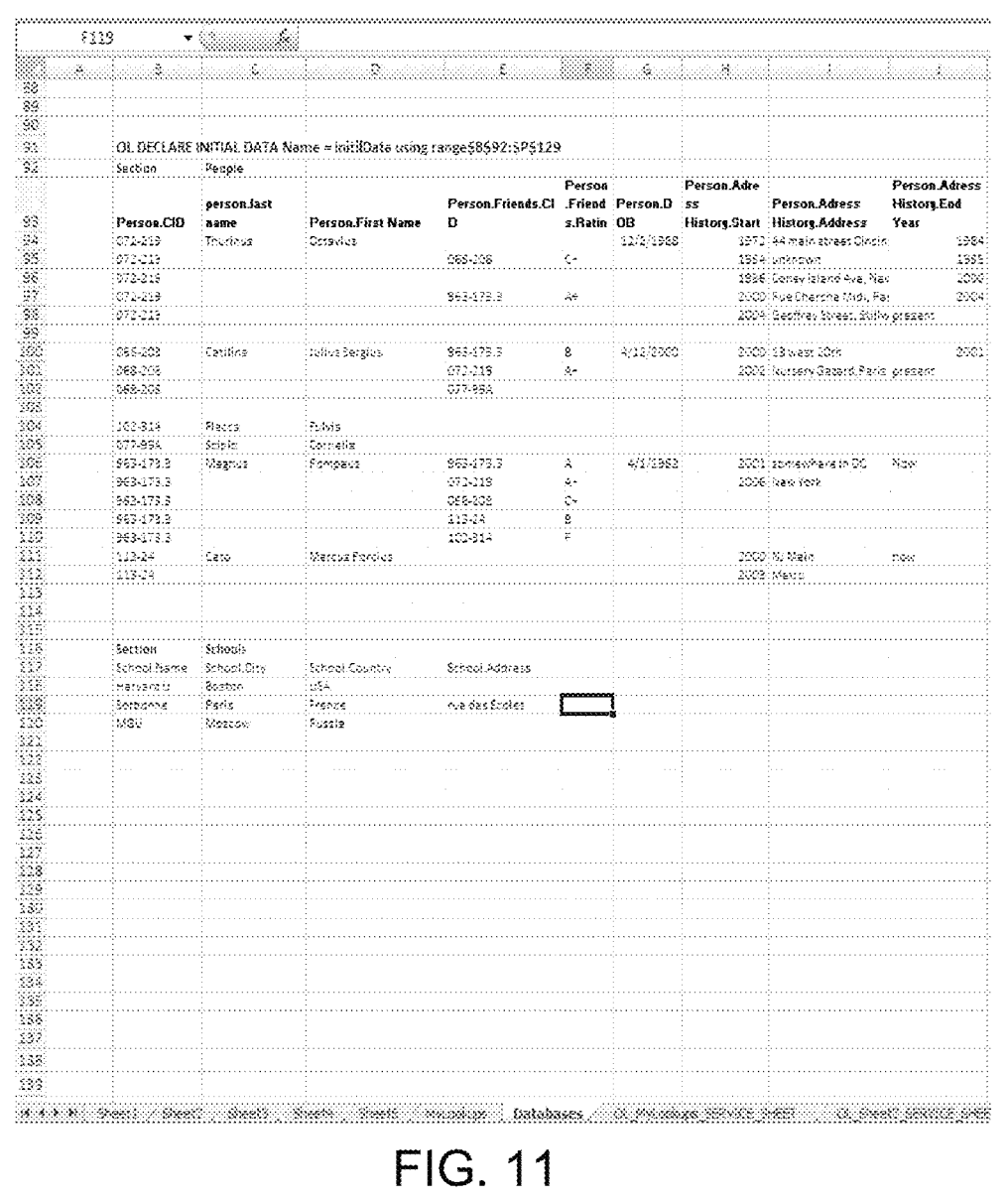

Once the logical model with its inner relationships is created (whether by hand by the user, or generated from the applications domain model), it can now be easily populated with a number of instances of test data as is suitable to the user. FIG. 11 illustrates an exemplary spreadsheet with populated data. The free-formatted table of data may be created by the user (when constructing a new application), or generated as a sample of the applications data (when adding an application component). The data occupy range B92:P129 of the spreadsheet in FIG. 11. An exemplary declaration command is entered into cell B92 of the spreadsheet as =OL_DECLARE_DATA("InitialData", B92:P129) expression.

The exact syntax by which field declarations in the DECLARE DATABASE expression are related to the cells with data values can and may vary widely. In our particular implementation a columnar notation is being used. If a user wishes to supply data for a field called ADDRESS, which is a part of ADDRESS_HISTORY collection belonging to a PERSON object, the user would insert a column within the range of cells embraced by DECLARE_INITAL_DATA declaration. Because the language implemented allows for multiple fields called ADDRESS (one can be part of ADDRESS_HISTORY collection, another a part of SCHOOLS objects, third a part of COMPANY object, for example), the user may supply a fully qualified name, such as PERSON.ADDRESS_HISTORY.ADDRESS as a column header.

Resulting series of columns may have fields from various levels of the objects. In the example above, it may include single properties of a PERSON (LAST_NAME, FIRST_NAME, current RENT and ADDRESS), as well as properties of the collections (historical ADDRESS and RENT from the ADDRESS_HISTORY collection).

In one embodiment, not all fields have to be filled. They can be in any order. Collections instances can be placed anywhere. Each collection has a "key." For example, CID is a key to a PERSON, while STAR_YEAR is the key to ADDRESS_HISTORY.

In one embodiment, the processor 20 may be programmed with instructions for an UPSERT relational function, that is to update when present and insert when not. In the example above, the first five rows of the first DATA section all deal with the properties of the same person (Octvaius Thurinus), CID of 072-219. By repeating the CID on 5 rows, we can now add two FRIENDS (CIDs 068-208 and 963-173.1, and 5 historical residences, starting at START YEAR 1972, 1984, 1986, 2000, and 2004 respectively.

The program may relate the fields of each collection to its key: FIRST_NAME Octavius to the CID 068-208, ADDRESS of "Rue Cherche Midi, Paris" and RENT of 99 to the START YEAR of 2000, etc. Similarly, Pompeus has 5 friends but only 2 prior residences, while Cornelia Scipio has no friends at all. Once the user confirms the data by hitting the "enter" key for the cell B92 which contains the DECLARE_INITIAL_DATA, if no errors were found, the user may get a confirmation text in the cell indicating success of the declaration. From this point onward, the data may automatically be available to the user in the spreadsheet language.

Figure 12:
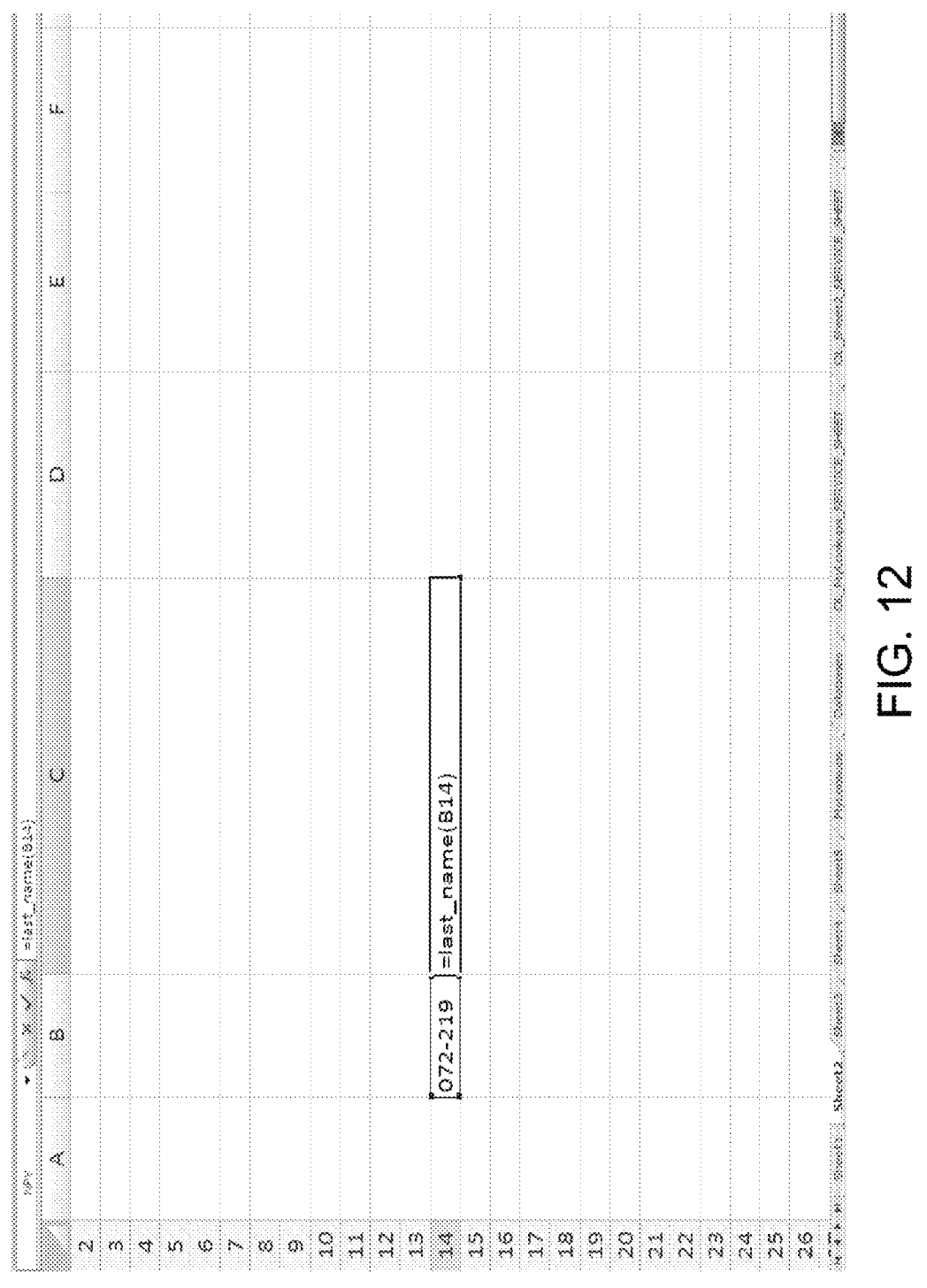

FIG. 12 illustrates a callable new command LAST_NAME in a spreadsheet application, according to one embodiment of the present disclosure. The new command is a fully legitimate member of the function category "user defined", with the proper attributes/paramters. Each such new command may present a number of options to the user as regards the exact parameters with which he can invoke it:

a) BY KEY. The proper key of the collection to which the field being accessed through this function belongs—072-129 for Person, or 2000 for START_YEAR b) BY INDEX. A user may retrieve any field of any collection by using simply indexes—5 for 5th person (Magnus), 2 for second ADDRESS c) NESTING. Properties of collections require a proper reference to the instance of the object to which this collection belongs: FRIENDS(2, PERSON(1)) may be used to retrieve 2nd friend of the first person in the data. ADDRESS(ADDRESS_HISTORY("2000",(FRIENDS(2,PERSON("963-173.3"))))) may be used to return "Rue Cherche Midi, Paris" by requesting the residence of year 2000 for the 2nd friend (Octavius as it happens to be) of the person with CID of 963-173.3 (Magnus).

d) Either the key or the index can be provided in the function call explicitly, as above, or as a cell reference.

e) NESTING can follow the same convention: the example on preceding page can be implemented by the user as:

i. Cell A1 may contain value 963-173.3 ii. Cell A2 may contain a function=PERSON($A$1)

iii. Cell A3 may contain a function=FRIENDS(2,$A$2), or it can have =FRIENDS($B$2, $A$2) assuming B2 contains number 2 in it at the time.

iv. Cell A4 may have=ADDRESS_HISTORY("2000", $A$3), or =ADDRESS_HISTORY($B$14, $A$3) with 2000 being placed in C14 v. Finally, the final cell may have=ADDRESS($A$4).

A user has full freedom of combining the two techniques, and doing something like: cell A2=FRIENDS(2,PERSON (A1)), and cell A3=ADDRESS(ADDRESS_HISTORY ("2000",A2))

Figure 13:
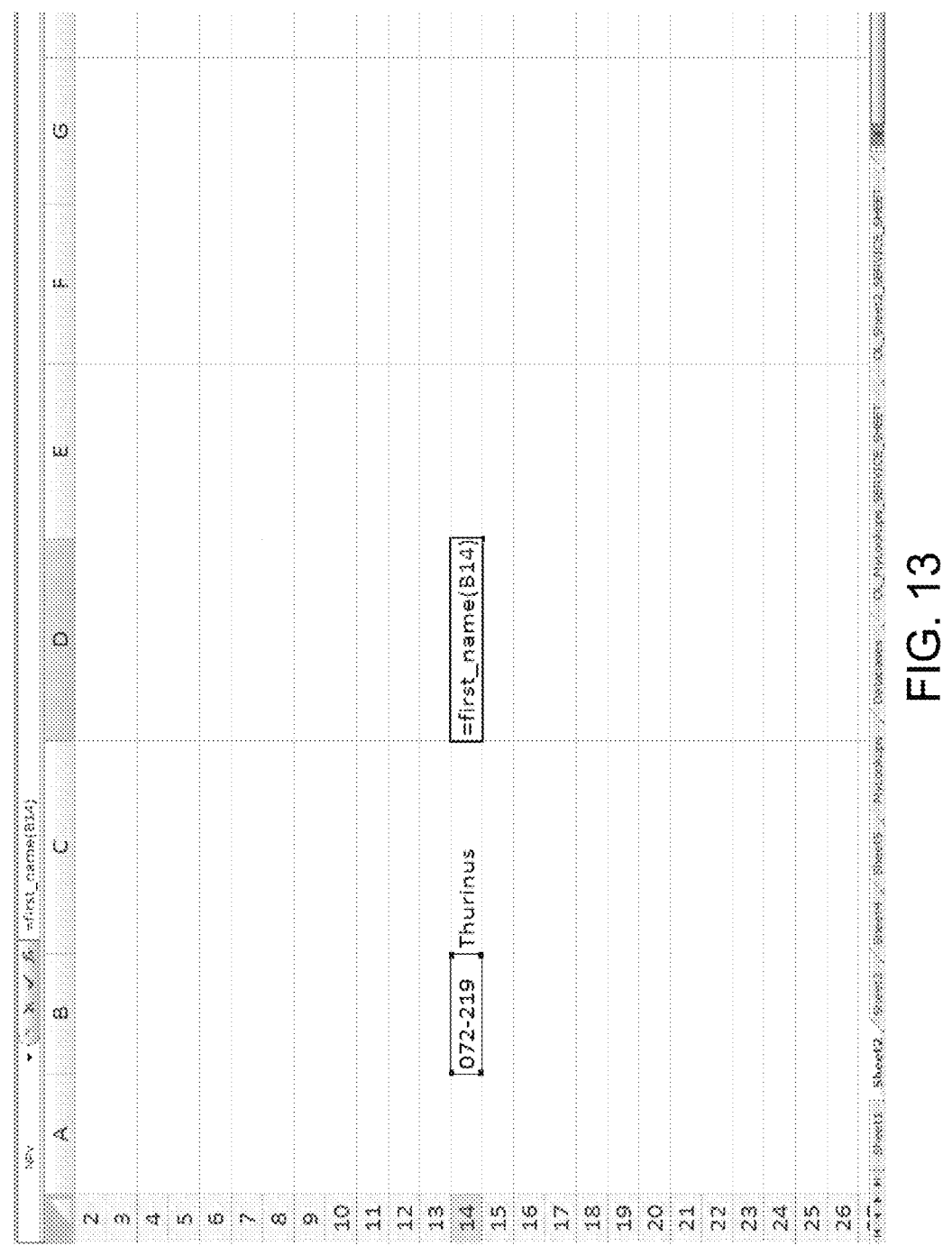
Figure 15:
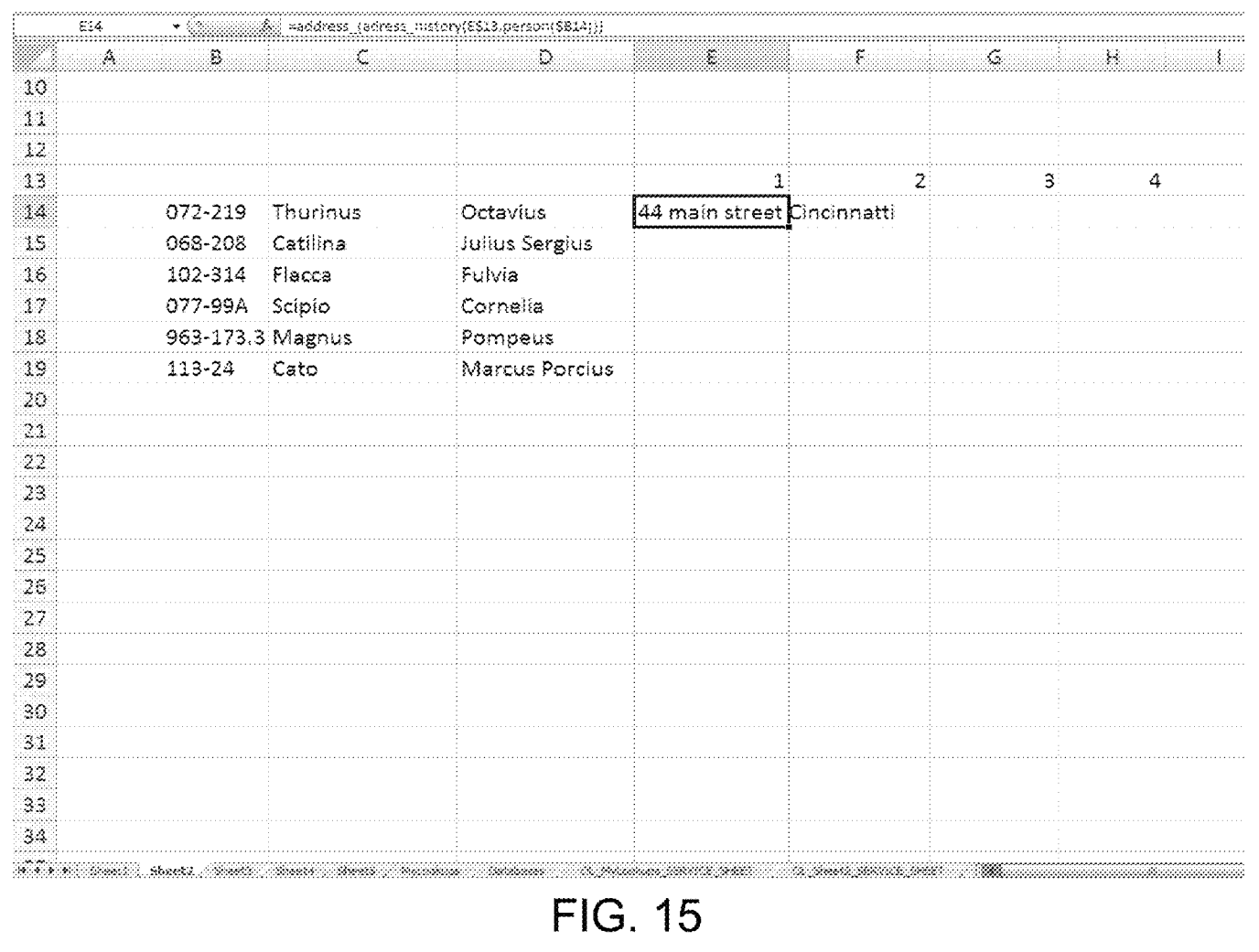

As shown in FIG. 13, the user invokes the new command First_Name of the person identified by CID 072-219. The expression=First_Name(B14) is entered into cell D14 of the spreadsheet in FIG. 13, producing the first name requested, Octavius, the outcome which which can be seen on FIG. 14. The user may enter a number of cells with values of CIDs (for example, B14 through B19 of FIG. 14). By simply selecting cells C14 and D14 and dragging down the selection, he may obtain the combinations of last name/first name for the list of customers identified by the keys in positions B14 to B19, as shown in FIG. 15.

Figure 16:
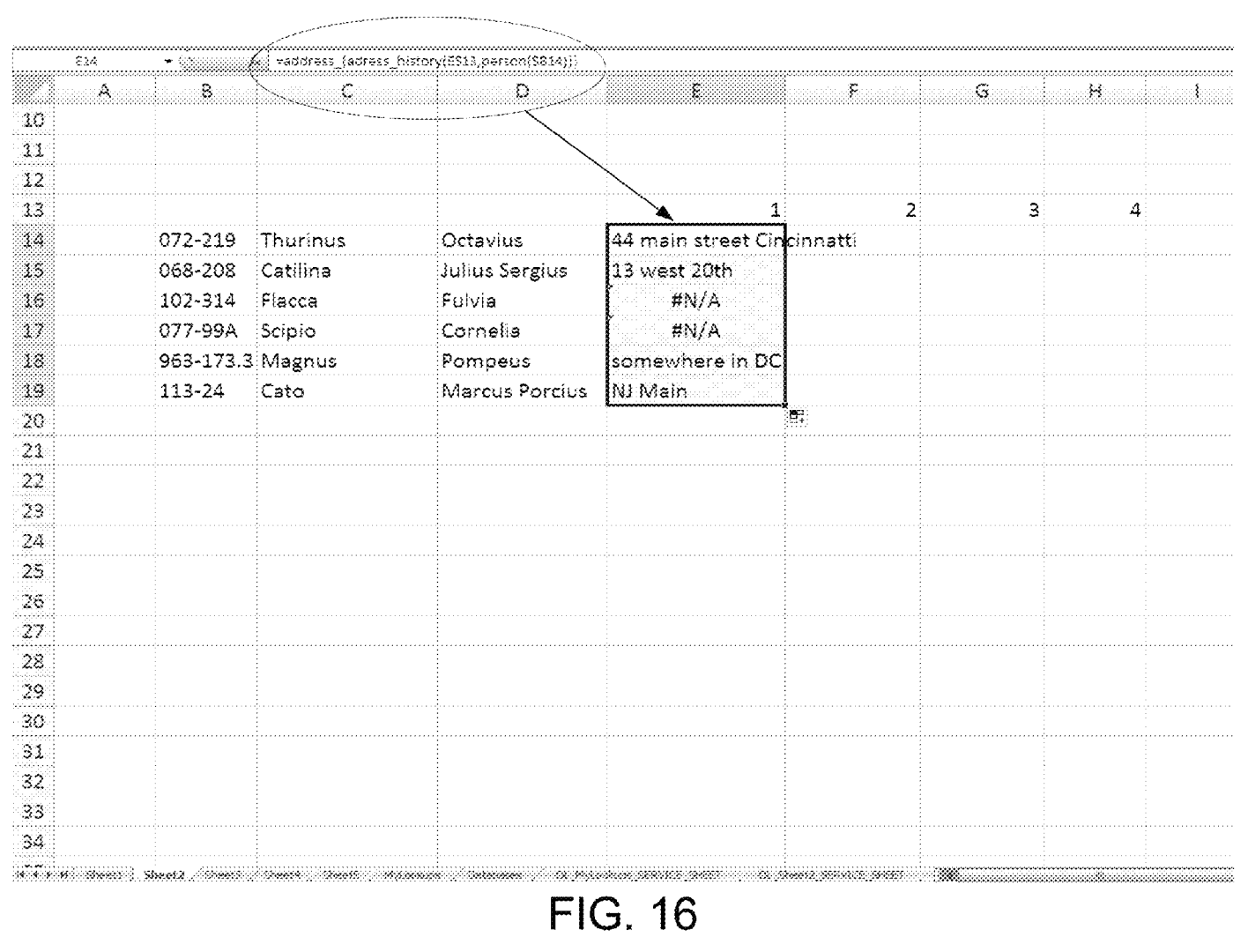

The operation can be performed along multiple collections. For example, in FIG. 15, the user may place a number of CIDs and obtained names, as was just described, in columns 14 through 19. To obtain all the past residence addresses for each of these people, access by index may be used. Index values 1 through 4 may be placed in row 13 columns E through H. As can be appreciated, for Excel® implementation, the user may fix the row 13 of the index by prefixing it with $ (making the reference E$13), and fix the column B of the customer ID by reserving it through the use of $ in the person Id cell (as $B14). The command may then be copied in column E rows 9 through 13, as shown in FIG. 16, and across columns E through H for the rows 8 to 13, as shown in FIG. 17.

Figure 20:
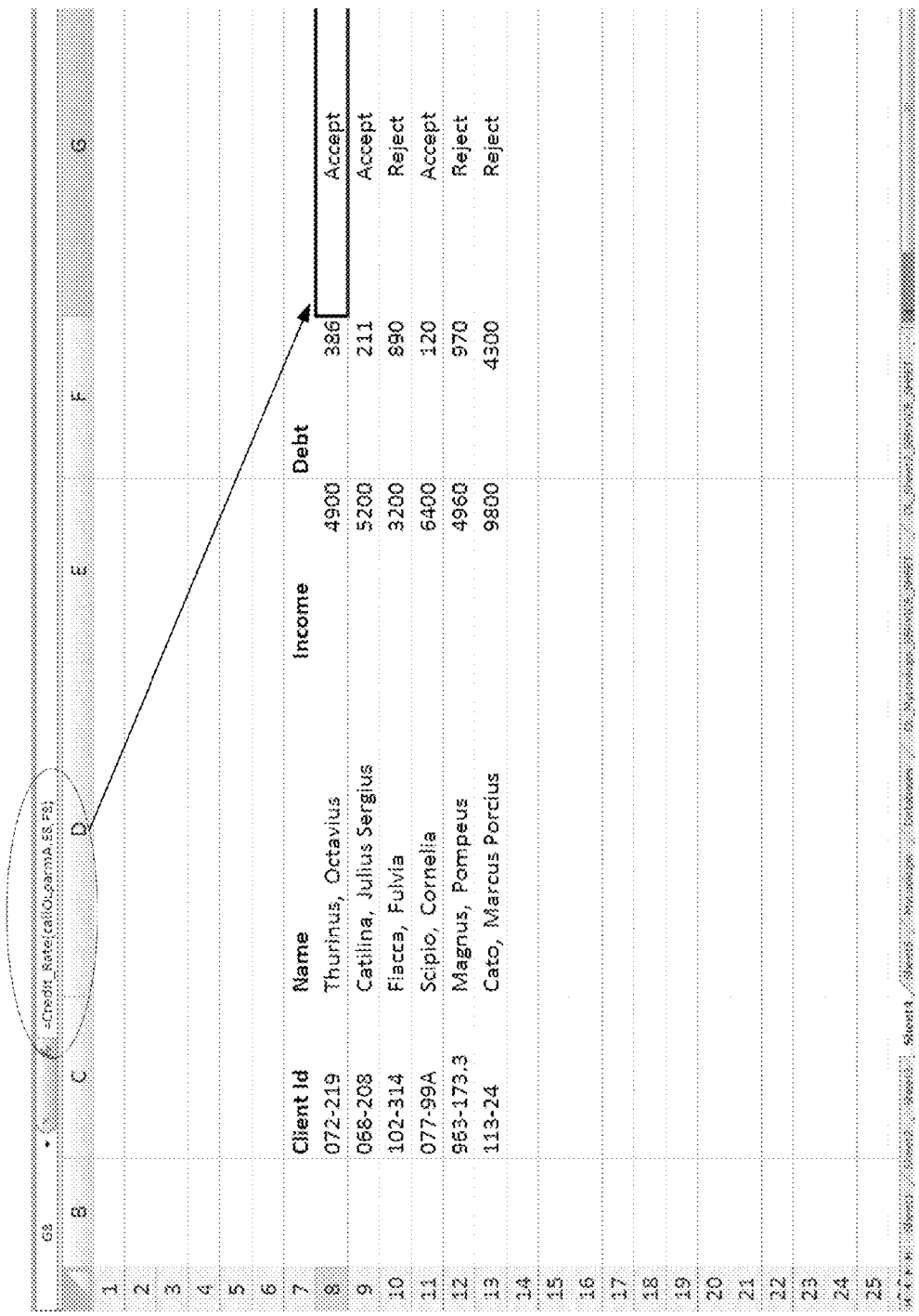

FIGS. 18-20 illustrate using new commands for a person's income and debt to populate the spreadsheet, according to an embodiment of the present disclosure. Whatever the particular syntax and details of implementation, the data definition logic retains full correspondence with the original data model. As can be appreciated, names of data properties that are defined in the application data mode's language can be mapped into the names of the data model as presented in the spreadsheet language. In one embodiment, names of properties in applications Java model may be directly mapped to names of fields in spreadsheet data model as illustrated above. As such, names of fields in spreadsheet data model may be directly mapped to names of generated data access functions.

In one embodiment, the declaration command may be used to support an option by which an application can be specially prepared for BI operations with our tool thorough construction of special user-friendly Data Dictionary, implemented as a sub-class over original application data model. This feature may be used to enable project teams define human-friendly names for data fields in order to improve readability of spreadsheets. In this case the mapping between application data model and the data model in a spreadsheet is accomplished by means of reading application's data schemas which connect the dictionary to the data model.

Figure 21:
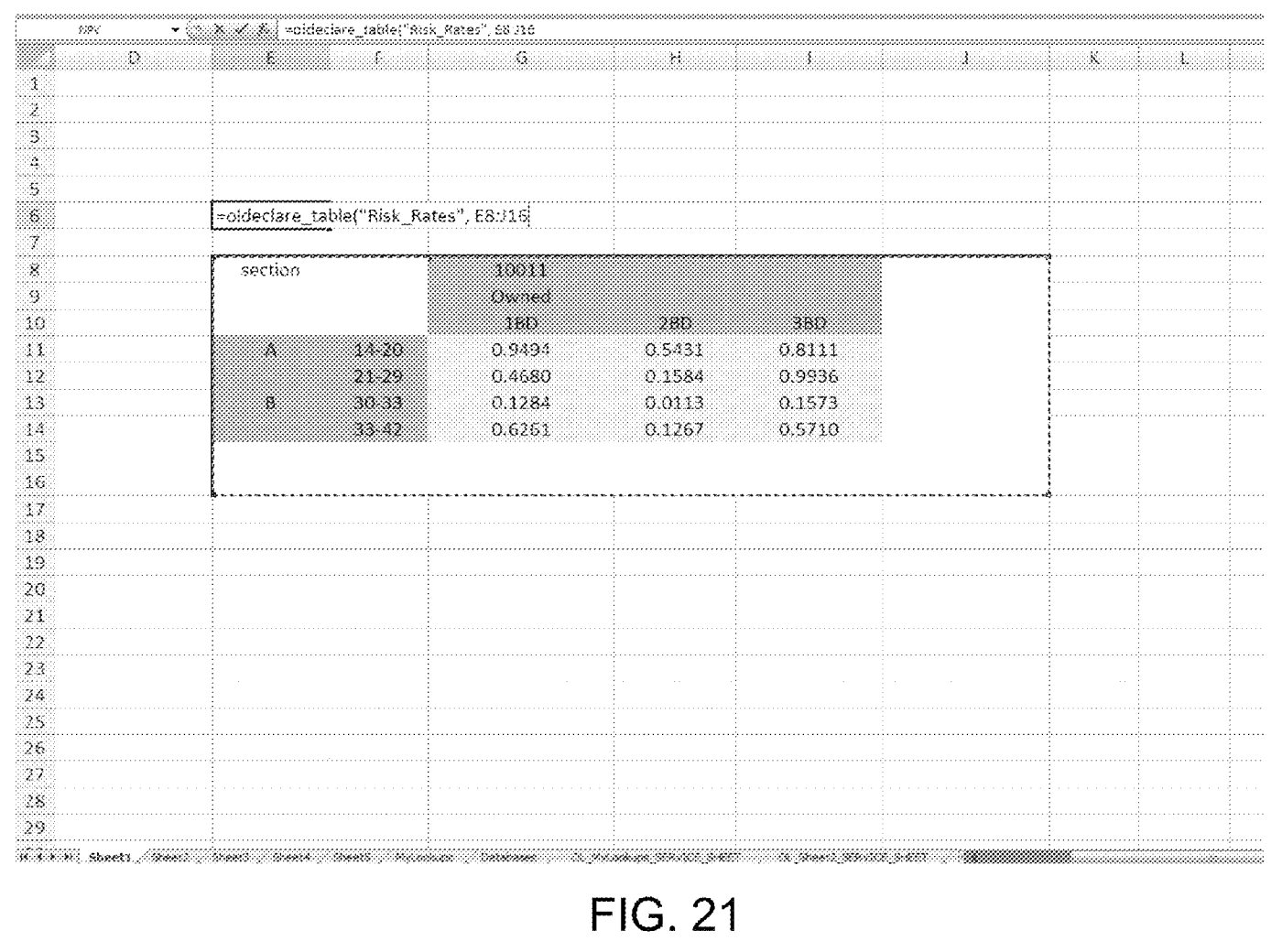

In certain applications, maintaining large volumes of static data representing constants in various calculations may be needed. Typical examples are found in insurance, lending, and other applications. FIG. 21 illustrates a callable new command for a static table, according to an embodiment of the present disclosure. FIG. 21 defines an exemplary set of discount rates for ZIP 10011, "Owned" type of insured property, for 1 or 2 or 3 bedrooms, zones A and B and 4 street ranges (14-20, 21-29, 30-33, 33-42). While this example illustrates a two-dimensional table, artisans would understand that the present disclosure may be applied to multi-dimensional database or tables.

One embodiment of the present disclosure may be directed to the translation between the two manners of expressing the data: representing tabular data in spreadsheet, and managing it in the database. More specifically, the elements of the table, as illustrated in FIG. 21, can be easily referred to in the spreadsheet language through the use of explicit row and column identifiers. In some spreadsheet products, a special direction may be given by the user to create the reference names out of column and row labels. In either case, however, the linguistic framework is untranslatable into an application system outside of the spreadsheet.

One embodiment of the present disclosure may introduce a general spreadsheet language extension, which would permit reference to the data elements through the expressions which are easily found in the language of applications. One implementation (Excel for spreadsheet product and Open L for the code generator and run time) uses the DECLARE TABLE command, as shown on FIG. 21.

As is the case with functions and other forms of data, the new command called RISK_RATES may be defined by the user and callable in the spreadsheet. The new command takes "dimensions" of the table as its inputs, and returns the value of the corresponding cell. For example, the table in FIG. 21 has five dimensions (for readability shaded in grey). In one embodiment, the new command may not require any declaration of names of dimensions, or their datatypes. The processor 20 may be programmed to infer the number of dimensions from the geometric shape of the table, and their datatypes from the FORMAT property of the cells in which they are entered.

Figure 22:
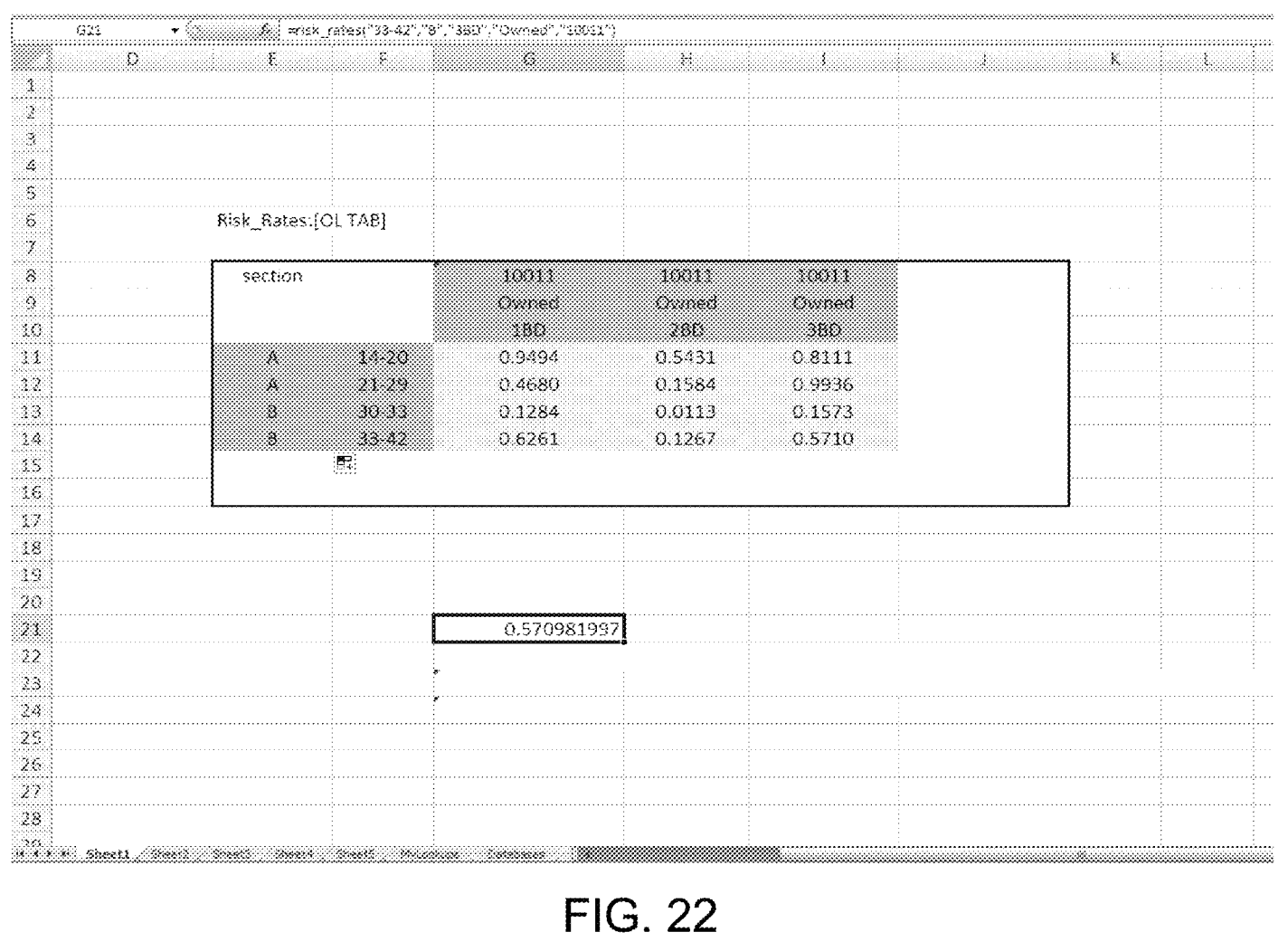

FIG. 22 illustrates retrieving a value from the table using the new command, according to an embodiment of the present disclosure. The user can place the simple enumeration of keys (into cell G21) in order to obtain the desired result. As illustrated in FIG. 22, the word "section" is included in the upper left corner of the table, 0 or more dimensions are placed on the rows, and 0 or more are placed on the columns. As can be appreciated, the processor 20 may be programmed to differentiate the dimensions from value cells by geometric intersection of row and column headers. Cells which have both are deemed to have values, otherwise they may be treated as dimensions. In the example above, rows 8, 9 and 10 may be deemed column dimensions because their cells have no corresponding intersection with rows. Similarly, columns E and F may be constitute the row dimensions. In contrast, cells $G$11:$I$14 each have both row and column dimensions, and therefore constitute cells with values.

The intersection may be determined by tracing the cells leftward and upward, until reaching the row or a column which contain the "section" keyword. Cell $G$11 runs into non empty cell $G$10 before reaching the row 8 (which hosts the "section" corner of the table). It runs into non empty cell $F$11 before reaching the column E. As a result, it may be deemed to belong to a full intersection and is, therefore, a cell. In contrast, each of the cells G8, G9 and G10 have no non empty cells to the left of them preceding column E, which makes them into column dimensions. Each of E11 and F11 have no non empty cells between themselves and row 8, which makes them into row dimensions.

Our implementation permits the user to omit repetition of identical values on the right of the column, and down the row, dimensions. In the example above and below, cells H8 and I8 are deemed to act "as if" they contained the value 10011 simply because 10011 is the nearest non empty value to the left of them. By the same rationale H9 and I9 may be treated as if they contained "Owned." Cell E12 may be treated as if it contained code "A", and E14 as if it contained "B".

As can be appreciated, other table dimensions may be implemented with the declaration command of the present disclosure. A table may have no non empty cells between "section" and the right-most edge of the declaration range. The table may be deemed to have no column dimensions (is all-rows table). As such, the last column may be treated as column of values, and the rest starting at the column which contains the "section" indicator as row dimensions. Alternatively, a table may be deemed all-columns because all is empty between "section" and the lower boundary of the declaration range. As such, the last row may be treated as row of values, and the rows from the one containing "section" to the end of the range as column dimensions.

In one embodiment, the declaration command does not call for explicit declaration of the dimension names and formats. In the exemplary embodiments, the reference to dimensions is, instead, positional. The user asks for cell values through the new command identifying the table name of the declaration (in our example RISK_RATES). The user may then supply the exact number of dimension values for the table (5 in this example). In the example illustrated in FIG. 22, the relative position may be, going from left to right:

a) If this is all-columns type table, the dimensions may be listed in the order from lower to higher in the sequence of rows, starting from the row nearest to the data.

b) If this is all-rows type table, they may be listed from right-to left in sequence of column, starting from the column nearest to the data.

c) If this is a table which contains both rows and column, the row dimensions may be listed first, in right-to-left columnar sequence, followed by row dimension in bottom-up row sequence.

As an example, the input '=RISK_RATES("33-42","B", "3BD","Owned","10011")' may reference the value 0.5710 in cell I14 of FIG. 22. As can be appreciated, data tables can spread across multiple worksheets and multiple workbooks. According to an embodiment of the present disclosure, the spreadsheet language may be used to define a "continuum" of tables, all united into a single reference name, or organized among multiple names.

Artisans would understand that functions and operations described above can be implemented using special purpose circuitry, with or without software instructions. For purposes of illustration, the following description provides exemplary implementations.

The embodiments of the present disclosure can be used as a component of an overall IT infrastructure. It co-operates with other elements, such as Application Domain Models, Application Logic, etc. It can co-exist and co-operate with other tools, open or proprietary. The embodiments of the present disclosure may be programmed for Java-based environments.

At this point, a special process is invoked which converts the Excel-expressed logic into production-ready application, as follows:

All OL_FUNCTIONS become Java functions with the same name as the same calling protocol of inputs and outputs (or dot Net functions, or the functions of the target language). Parameters may be passed by position, or by name, as may be described later in details sections.

The compiler follows the chain of calculations embedded in a workbook, which is enabled by public interfaces to spreadsheet products (in case of Excel Microsoft publishes Office Object Model for Excel which permits well defined method of reading the spreadsheet logic in its complete semantics).

All references to the data objects are converted into regular target language data references. This is possible because the application domain model has same properties and same structures as the properties and structures in Service Model for Excel, carrying same exact names and same exact parameters for all GET methods.

All OL_TABLES are converted into target language static data tables, and their access functions become access functions in Java. The functions carry the same names and accept same parameters.

They are implemented as "on demand" functions—i.e. unlike regular Excel®, functions they do not perform their primary job on each invocation, but only when the user requests their operation explicitly, by touching the cell in which they are defined (this choice of syntax and the exact manner by which the user indicated his desire to perform the appropriate task can vary and is subject to implementer's creativity; for example, it could be done through hotkeys, or buttons).

These functions may be "on demand" functions to perform both heavy and infrequent duties, such as creation of a whole new function or method, or change of the base data model. As may be seen below, we do not need to re-run the declaration step of a function when the user changes the logic of an already defined function—all such changes may become immediately active and all caller cells may be immediately recalculated.

Figure 23:
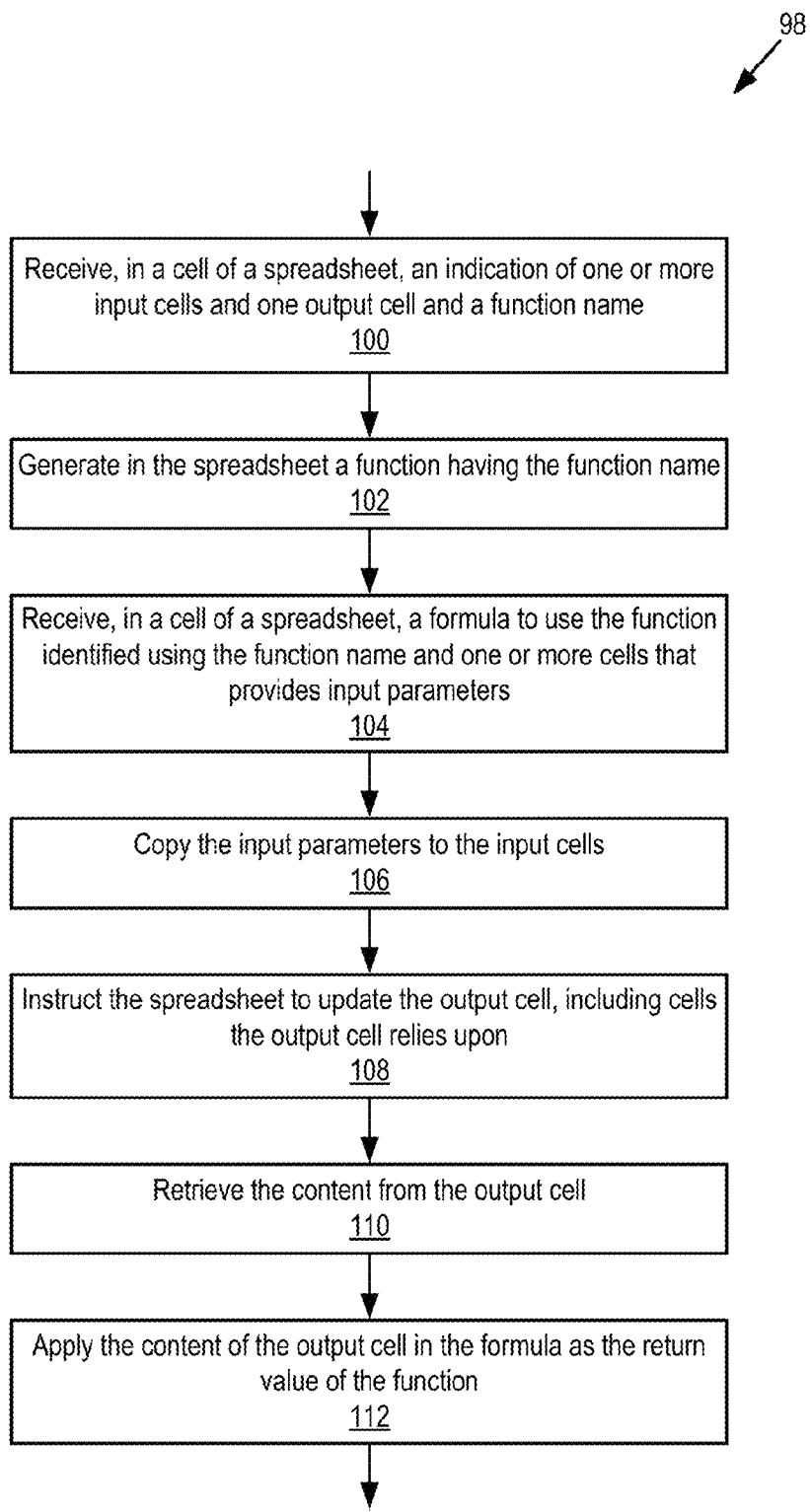
FIG. 23 illustrates an exemplary flowchart for executing a new command in a spreadsheet cell, according to one embodiment of the present disclosure.

FIG. 23 illustrates an exemplary flowchart 98 for executing a new command in a spreadsheet cell, according to one embodiment of the present disclosure. The processor 20 may be programmed with instructions to receive, in a spreadsheet cell, an indication of one or more input cells and at least one output cell and a function command name (100). Next, the processor 20 generates in the spreadsheet a function having the command name (102). The processor 20 may then receive, in another spreadsheet cell, a formula to use the function identified using the command name and one or more cells that provides input parameters (104). The processor 20 may copy the input parameters to the input cells (106), and update the output cell (108). In one embodiment, the processor 20 may then retrieve the content from the output cell (110) and apply the content of the output cell in the formula as the return value of the function (112).

Exemplary Implementation Details for Excel®-Session Open and Initialization:

The code for Language Extensions may be delivered, in the case of Excel implementation, as an Excel Add-In (standard practice described by Microsoft—a standard method to extend Excel functionality).

On initialization, the Add-In installs what's called EVENT HANDLERS—procedures which may be called by Excel every time a cell in Excel is CHANGED, or a workbook is OPENED/CLOSED, or a sheet is CALCULATED. An exemplary code implementation may be as follows:

' VBA procedure which installs event haldlers.
Option Private Module
Public eHandle As New AppClassesForEvents
Public Sub App_Class_Initialize( )
Dim pp As OLparmStd
Set eHandle.App=Application
End Sub On Demand functions may be serviced by the event handling procedure ON CHANGED. An exemplary code implementation may be as follows:

Private Sub App_SheetChange(ByVal sH As Object, ByVal target As Range)

The procedure may be invoked by Excel after change operations had been completed. The procedure is given addresses of cells that had been affected by the change (according to Excel specification published in the above referenced book). The procedure may examine the nature of the change performed by the user. In particular, it may be looking for:

a) Introduction of a new On Demand function
b) Elimination of previously defined On Demand function
c) Change to the declaration of a previously defined On Demand function
d) Change to one of the range parameters which constitute the body of DATABASE, DATA, TABLE, or DECISION_TREE declarations
e) Change to one or more cells on which a previously defined FUNCTION declaration depends for its result.

The procedure may perform proper bookkeeping operations for each of the newly introduced declarations. In particular, it may insert an invisible Excel NAME object into user's workbook, using standard WORKBOOK.NAMES.ADD method. The NAME property of the newly inserted object is a concatenation of a standard prefix for each of On Demand functions (e.g. OLfunction="OLfunction_" for function, etc.), and of the name given to the function by the user (e.g. credit_rate, resulting in "OLfunction_credit_rate"). The REFERENCE property of the NAME object is the location of the declaration. This technique permits the product to discover location of the declaration regardless of the column, row and cell insertions and deletion performed by the user over the lifespan of the declaration, since Excel may maintain the always-correct reference to the cell location identified by the name.

It may then perform operations proper for each newly defined declaration and described for each below. In the event a previously defined declaration had been eliminated by the user, the handler may reverse the bookkeeping effects which were introduced on its creation (such as eliminate the corresponding NAME object). It may also remove the fragments of code it inserted into users workbooks at the same time.

In some cases, instead of removing them altogether it may replace them with the versions which produce the test "Function <so-and-so> At Location <such-and-such> Had Been Removed". One objective is to give the user an easily interpretable error instead of the regular #NAME? which Excel may put into the calling cell if the function is simply removed.

For changes in declarations parameters, in the body of parameter ranges, and in the formulas on the function dependency chain, the ON CHANGE event handler may (upon having implemented the requested operation through, essentially, a repetition of actions done on its original introduction) force a re-execution of all instances of formulas which include calls to OL-managed client functions. This operation is accomplished through rewrite of a fragment of the VBA code in the user's workbook which corresponds to the On Demand function being affected, and then calling a CALCULATE method on all worksheets of the workbook.

For each On Demand OpenL DECLARE function, a proxy function coded in Visual Basic for Applications and carrying the identical name may be automatically created in the workbook of the user. The duty of proxy On Demand functions is three-fold:

To provide an Excel-legal language expression for On Demand functions

To report success or failure of the proper operation of an On Demand tasks described immediately below To provide the locations and type definitions of function parameters during run-time (described in the FUNCTIONS section). This is one of the possible techniques which allow the implementer not to create any additional storage for Language Extension metadata and use exclusively standard storage provided by the workbook.

On workbook OPEN event, the controlling program may perform "RESTORE RUN TIME ENVIRONMENT" operation, which is described below and which depends on the object being restored. In some cases, Excel may activate the ON OPEN event and load the controlling program even if it had been previously de-installed as the Add In using other workbooks. In these cases, the controlling program may perform all de-initialization operations that it would normally do against the workbook active at the time of de-installation.

On Add-In de-install, the program may remove all workbook connectivity to itself. It is our choice to leave a version of proxy functions in place in the user's workbook rather than eliminate them. These are called "INACTIVE" versions, and their purpose is to report "OpenL had been de-activated" message to the owner of the workbook. The objective is enable users re-install the program if the de-installation occurred accidentally (or in case of change of mind), and re-activate all the workbook's functionality without having to re-code the workbook.

Exemplary Implementation of DECLARE_FUNCTION in Excel®:

For each new declaration, the ON CHANGE handler may perform as follows. The parameters of the declaration are parsed out of the declaration command, verified for correctness, and error messages are communicated to the requesting user in cases of problems.

For each new command, its cell location is registered as an invisible Excel Name object referencing the cell in which the function is written (OLfunction_credit_rate in the example which we are following). This permits the controller program to know the location of the function declaration command even if the worksheet is changed by the user performing insertions and deletion and movement and copying of cells, rows, and columns.

Using published Add-In APIs (see "Microsoft Office Excel 2007 Developer Reference, incorporated herein by reference"), the controlling program may automatically insert a fragment of Visual Basic for Applications code into the user's workbook. An exemplary code implementation may be as follows:

Public Function CREDIT_RATE(ParamArray p( ) As Variant)
Dim pp As Variant, callTyp As String
pp=p
kRet=Ol_call_New("Sheet5", "OLfunction_credit_rate", NewCallType, pp)
If isNumeric(kRet)=True Then credit_rate=CDbl(kRet) Else credit_rate=kRet
Exit Function
End Function This makes the function "CREDIT_RATE" available to Excel user as a legal Excel function. The controlling program may connect the newly created VBA code fragment with the main codeline in the Add-In (in this case an internal function called OL_call_New) through a standard interface object called "reference".

When Excel calls the function CREDIT_RATE following user's writing it into one or more cell formulas in the workbook, it may immediately pass control to a general program called OL_call_NEW which may be included with the Add-In. This program may know both the name of the function which calls it (by decoding the second parameter), and the target spreadsheet.

The second parameter (OLfunction_credit_rate) may also be an Excel "name" object which contains the actual cell address of the DECLARE function for the CREDIT_RATE. This may permit the OL_call_NEW program determine which parameters need to be placed where in the target spreadsheet once CREDIT_RATE is invoked. This completes the operation of DECLARE_FUNCTION operation. The new function may now be called.

Last act of the on change controlling program performing declaration of a FUNCTION is to force the recalculation of all cells in the workbook which used the function in cases when its parameters are being changed (as opposed to cases when it is fully created; recall that the re-declaration is not required if the function logic changes, only if the number or the order of parameters does).

This is accomplished by various methods. The easiest is to update the invisible name OpenL, or use DIRTY/CALCULATE methods of Excel standard library against caller sheets, or use DIRTY/CALCULATE methods against the recorded locations of calling functions. For certain versions of the Excel the update of Visual Basic code in the body of the workbook, and executing ACTIVESHEET.RANGE("A1"). FORMULA=ACTIVESHEET.RANGE("A1").FORMULA may do the job.

Exemplary Implementation of DECLARE_DATABASE in Excel®:

The parameters of the declaration are parsed out of the declaration command, verified for correctness, and error messages are communicated to the requesting user in cases of problems.

For each newly created database declaration its cell location is registered as an invisible Excel Name object referencing the cell in which the function is written. The name is comprised form the standard prefix OLdatabase_="OLdatabase_" and the name chosen by the user and provided as the first parameter of declaration. This permits the controller program to know the location of the function declaration command even if the worksheet is changed by the user performing insertions and deletion and movement and copying of cells, rows, and columns.

The range parameter of DECLARE_DATABASE is interpreted by a special program, which creates a run-time dictionary of data fields and their relationships (or reports user errors if such are found). The run-time dictionary may be stored in PUBLIC storage of Visual Basic for Applications, which would make it available to all subsequent programs throughout the entire Excel session until the workbook closes.

This run-time structure is restored on every workbook OPEN as described above as RESTORE RUN TIME ENVIRONMENT operation. The restoration is identical to the execution of new declaration except for registration of the new function in Excel Names collection.

Using published Add-In APIs, the controlling program may insert a fragment of Visual Basic for Applications code into the user's workbook—one for each property (field) of the declaration. An exemplary code implementation may be as follows:

Public Function Last_Name(ParamArray p( ) As Variant)
Dim pp As Variant, callTyp As String
pp=p
kRet=OL_Get_Prop("Last Name", pp)
If isNumeric(kRet)=True Then Last_Name=CDbl(kRet) Else_
If isDate(kRet)=True Then Last_Name=CDate(kRet) Else_
Last_Name=kRet
Exit Function
End Function This makes Last_Name a legal and callable Excel function, whose purpose was described in the first part of this paper. The new function may be connected through REFERENCE object member of Add-Ins collection to the function called OL_Get_Prop. When called, it may pass its input parameters along with the name. OL_Get_Prop is a general function may use the name passed to it as a name of the property whose value is being sought by the user.

Function names created for data properties may be edited for compliance with Excel syntax: special characters such as blanks may be replaced by legal characters such as underscores, and in case of name conflict with existing Excel functions the names may be disambiguated by appending underscores to them.

Due to special features of Excel Language Extension, there is no problem with duplicate property names in database definitions, the details of which technique may be described below.

Exemplary Implementation of DECLARE_DATA_LOAD in Excel®:

The parameters of the declaration are parsed out of the declaration command, verified for correctness, and error messages are communicated to the requesting user in cases of problems. For each newly created load declaration its cell location is registered as an invisible Excel Name object referencing the cell in which the function is written. This permits the controller program to know the location of the function declaration command even if the worksheet is changed by the user performing insertions and deletion and movement and copying of cells, rows, and columns.

The range parameter of DECLARE_DATA_LOAD may be interpreted by a special program, which creates a run-time structure of data elements and their relationships (or reports user errors if such are found). The run-time dictionary may be stored in PUBLIC storage of Visual Basic for Applications, which would make it available to all subsequent programs throughout the entire Excel session until the workbook closes.

This implementation may utilize nested ARRAY OF VARIANTS data type provided by Visual Basic for Applications to store the structure, but many alternatives would be possible. This run-time structure is restored on every workbook OPEN as described above as RESTORE RUN TIME ENVIRONMENT operation. The restoration is identical to the execution of new declaration except for registration of the new function in Excel Names collection.

Exemplary Implementation of DECLARE_TABLE in Excel®:

The parameters of the declaration are parsed out of the declaration command, verified for correctness, and error messages are communicated to the requesting user in cases of problems.

For each newly created static data declaration its cell location is registered as an invisible Excel Name object referencing the cell in which the function is written. This permits the controller program to know the location of the function declaration command even if the worksheet is changed by the user performing insertions and deletion and movement and copying of cells, rows, and columns.

The range parameter of DECLARE_TABLE may be interpreted by a special program, which creates a run-time structure of data elements and their relationships (or reports user errors if such are found). The run-time dictionary may be stored in PUBLIC storage of Visual Basic for Applications, which would make it available to all subsequent programs throughout the entire Excel session until the workbook closes.

This implementation may utilize nested ARRAY OF VARIANTS data type provided by Visual Basic for Applications to store the structure, but many alternatives would be possible.

One difference between TABLE and DATABASE structure is the nature of the data loads and of the metadata, caused by difference of intended usages. While DATABASE is a reflection of the application data model and has a typical object structure, the TABLES are special cases of multidimensional data which require a lot less metadata definitions. Also, DATABASE may be used to contain a sub-set of application data intended for testing, while TABLES may be used to provide production system information such as risk rates for insurers, etc. As such, TABLES may not follow a two-step declaration process as the DATABASE does (schema followed by data). Both are inferred from the layout of tables themselves. There may also be differences between the layouts of the data too: while database data reside in one worksheet and follows single horizontal pattern, the tables are expected to be provided in multiple fragments, spanning multiple sheets or even workbooks, and their layout may vary depending on user's preferences on a case by case basis. Some layouts may be in rows, some in columns, and some in a mix.

This run-time structure is restored on every workbook OPEN as described above as RESTORE RUN TIME ENVIRONMENT operation. The restoration is identical to the execution of new declaration except for registration of the new function in Excel Names collection.

Using published Add-In APIs, the controlling program may insert a fragment of Visual Basic for Applications code into the user's workbook—one for each declared table name (uniquely, tables can be declared on multiple sheets; the user would supply the same name for all such fragments and fragments collections). Below is a sample code used in the current implementation. An exemplary code implementation may be as follows:

```
Public Function Risk_Rates(ParamArray p( ) As Variant)
Dim pp As Variant
pp=p
kRet=OL_MTABLE_GET("Risk_Rates", pp)
If isNumeric(kRet)=True Then Risk_Rates=CDbl(kRet)
Else Risk_Rates=kRet
Exit Function
End Function
```

This makes Risk_Rates a legal and callable Excel function, whose purpose and usage was described in the first part of this paper. OL_MTABLE_GET is a function very similar to OL_Get_Prop and is described in greater detail below.

Exemplary Implementation of FUNCTIONS and METHODS During OpenL Runtime:

Since spreadsheet products in general, and Excel in particular, do not permit modification of context inside user written functions due to above rationales, the execution structure of one embodiment of the present disclosure is based on a "messaging" protocol between the caller and the called. Basically, the caller function sends a "message" to the target spreadsheet, and returns an intermediate value. Target spreadsheet may be driven in sequence of calls emitted against it as per outstanding "message queue".

Upon performing the calculation on behalf of a "message", it may deposit the response in a "return message" and proceed to calculate the response to the next. The "return message" is implemented as a "wake up call" to the source cell containing the calling expression. The cell is forced by it into recalculation, calling the same function once again. This time, however, the special program which implements "message broker" logic may hand over the return value to the function code, which may in turn return it to the spreadsheet product which may dutifully display it.

Spreadsheet products in general, and Excel in particular, have a propensity to call functions "just in case", relying on the them being free from side effects and to be faithful to the second principle of declarative languages (same results for same inputs). "Wake up calls" therefore may be followed by "just in case" new invocations—unless care is taken NOT to execute those, the cycle of "message out"-"temporary return"-"wake up return message" can repeat endlessly.

Exemplary Implementation of OL_Call_NEW Function in Excel®:

Below is a description of steps taken by the calling function (such as above-described CREDIT_RATE during its execution. These operations are being performed for one or more embodiments by the function previously referred to as OL_call_NEW, which receives control from the calling function on each invocation.

First the location of the function invocation may be determined, using standard published method APPLICATION.THISCELL. See Microsoft Office Excel 2007 Developer Reference, incorporated herein by reference in its entirety. For example, if "=CREDIT_RATE( . . . )" expression is found in a cell D14 of Sheet1, the run-time value of the reference to may be Sheet1_SERVICE_SHEET!$D$14.

Next the function inquires it had previously emitted a message requesting execution of an OL function, and if so whether there is a waiting response. The responses are placed in a specially designated DOCUMENT SCRIPTING associative array, and standard methods are provided by Microsoft to interrogate the presence of objects in it. Specifically, during an ON OPEN event, the following code designates the variable MsgPost as the "associative array":

```
Set MsgPost=CreateObject("Scripting.Dictionary")
```

The following code places a return message directed towards the calling cell (the program performing the operation may be described later in "message broker" section:

```
keyS=addressE & "!" & wB.Name & "!" & sH.Name & "!"
&
CellAddr.Address
MsgPost.add keyS, MessageBody
```

The following code checks if the return message had been sent, and retrieves it if so:

```
keYitem=addressE & "!" & iAm.Worksheet.Parent.Name
& "!" & iAm.Worksheet.Name & "!" & iAm.Address
If MsgPost.exists(keYitem) Then
rC=MsgPost.Item(keYitem)
OL_readPost=rC
MsgPost.Remove (keYitem)
Else
OL_readPost=" "
```

Special provisions may be made to handle cases when a cell contains expressions which invoke multiple OL functions, or the same function multiple times, as, for example in:

```
=IF(A1>0, CREDIT_RATE(A1,B1), CREDIT_RATE
(A2,B2))
```

When a call to an OL function is received from a location which already has the outstanding message requesting function execution it, a determination may be made as to whether we are dealing with the subsequent invocation of the same function instance, or a distinct instance located in the same cell. The criteria applied may be a) The name of the function
b) number, types, and addresses of the parameters If there are multiple invocations of the same function with the same exact parameters, we may treat it as a single instance. If the function finds a response to its previously emitted call, the return message may contain the callItem object (described below), which on return includes the return value. The function may retrieve it, and return it to Excel for rendering to the user. An exemplary code fragment may be as follows:

```
Set callResp=OL_readPost(MsgReturnResult, callId) '
read the message
If callResp Is Nothing Then GoTo not_a_return ' if there is no
mail,
callItem=callResp.res ' otherwise obtain
the return value
OLcallFunction=call Item.fRes ' inform Excel of
the return value
Call OL_funcReleaseCallItem(callItem.callerId) ' shred
the mail
Exit Function ' return
```

If no responses to previous requests are found, the function may send a new message requesting execution of the appropriate function. Using OLFunction_<functionName> name object described above, it may locate the declaration command for the function being called (Set funcAddress=wBcode.Names("OLfucntion_creditrate"). RefersToRange method may be used, as prescribed by the "Microsoft Office Excel 2007 Developer Reference". It may parse out the parameters expected by it using the same parsing method as was used by ON CHANGE control program. It may verify that the number and the types of the parameters presented right now match those expected by the target function. If mismatch is discovered, the error message may be returned and the function may exit. Otherwise:

```
not_a_return:
oP=OL_getTarget(wBcode, funcName)
If oP.pp.errorNbr < >0 Then
```

OLcallFunction=oP.pp.errorText
Exit Function
End If
Call OL_verifyParms(pr, oP)
If oP.pp.errorNbr < >0 Then
OLcallFunction=oP.pp.errorText
Exit Function
End If It may create a new instance of callItem message object. The object may serve as a parcel destined for the roundtrip—from caller to the "message broker" who may execute the request contained therein, and back to the caller upon completion this time carrying the result. It may fill the object with the information specifying the request: workbook and address of the declaration of the function being called, values of parameters requested and locations of parameters expected, and trace data to assist in problem resolution and trouble shooting. For example:

Set callItem=New OL_CallItem ' create a new instance of the mail
Set callItem.callerId=callId ' cell address from where the call is coming
Set callItem.wBcode=wBcode ' workbook of the target function
callItem.funcName=funcName ' name of the target function
Set callItem.funcLoc=oP.targ ' location of target declaration
callItem.funcParms=oP.parms ' parameters expected
callItem.parms=pr ' parameters given
callItem.callerIdTrace=callId.Worksheet.Parent.Name & "!" & . . .

For the outgoing a different courier mechanism may be used. Instead of associative array, a plain COLLECTION object may be used. The difference is motivated by the fact that unlike the SCRIPTING DOCUMENT, the COLLECTION has a built-in notion of order of messages. While this is not essential for the correct execution of the calculations, the execution of calls in the sequence which Excel determined based on its logic has highest likelihood of best performance. For example:

callStack.add Item:=callItem ' send outgoing message

The function may return a text indicating that the cell is waiting for response from the message broker. Excel may flash this text in the cell, which may or may not be observed by the user depending on which worksheet it is and the speed of calculation. An exemplary code implementation may be as follows:

OLcallFunction="Waiting at '" & callId.Worksheet.Name & "' !" & called.address
Exit Function The return message may arrive instantaneously. The function command may be called again, and perform the above-described operations.

In order to perform tasks contained in "messages", send back responses, and implement the "wake up call", there is a fragment of code, referred to herein as "Message Broker". Message Broker may be implemented as an ON CALCULATE event handler of the Add-In program. According to Excel specification, it is granted its execution time after all calculations on the sheet take place—in other words after all the cells which Excel deems as in need to recalculate the value of our function have been invoked.

In order to assure non interference with both itself and other components of processing, a special lock may be implemented in the system. One basic function is that both message broker and ON CHANGE event handler may abstain from activity while the lock is reserved. The lock may be reserved at the start of both ON CHANGE and Message Broker, and released immediately before return. An exemplary code implementation may be as follows:

' . . . at the start
If OL_pReserve(rHSheetChange).pp=1 Then Exit Sub
'OLpReserve function sets the lock if it has not been set yet, but returns 1 if it finds it set.
<operations>
Call OL_pRelease 'OL_pRelease function releases the lock In one embodiment, the message broker proceeds as follows. For each outstanding message, taking them off the queue one at a time, it may move the inputs into the locations of the target spreadsheet (known to it from the invisible name object which points to the function definition which contains its parameter addresses). An exemplary code implementation may be as follows:

For i=0 To UBound(callItem.funcParms) 'number of parameters
sH.Range(callItem.funcParms(i)).Value=callItem.parms(i) 'move the
value
Next i This event causes Excel® to recalculate the target spreadsheet with the new cell values parameters, as per its primary behavior. This may in turn drive more calculate events: all event handlers may become "inactive" when either one of them is doing work, including Message Broker. Message Broker does not need to be granted control at this stage. It already has it. Message Broker may continue executing messages until it exhausts the queue. An exemplary code implementation may be as follows:

Do While callStack.Count>0
<perform parameter moves, force calculations>
<perform response actions>
callStack.Remove 1
Loop If the target spreadsheet itself contains calls to downstream functions, the message queue may have additional members added to it during the step of target calculation. Message broker has special provision by which he may assure to process all the messages emitted by the target (and by downstream targets too) during calculation call for a particular client message before declaring this message fully serviced and putting it into return post. This may be accomplished by pushing the entire outstanding message queue aside, creating a new message queue into which all messages created during servicing the message would be deposited. The message broker may call itself (recursively), except this time it may read from the new message queue. The operation can repeat for as long as there are functions calling further functions. When the downstream chain of function calls gets exhausted, the message broker may return. At this point it may drop the special new queue, and recover the one it set aside, and proceed with the next message residing there. An exemplary code implementation may be as follows:

Set saveCalls=callStack 'push current post office aside
Set callStack=New Collection 'set up a new special post office for downstream calls
Call OL_callTarget(callItem) 'move the parameters into target, force calculation
Call OLfuncCtl 'in case the special post office has downstream calls, process them by calling message broker recursively Set callStack=saveCalls 'abandon special post office, and restore the original one When the calculation of the target completes (which may occur after the last parameter is moved in), the execution returns back to Message Broker (as from the function call). Message Broker may obtain function's result from the declared return cell, and deposit it in the callItem messaging object to be deposited in the MsgPost queue (described earlier in On Demand section), destined for the cell which contains the function reference. An exemplary code implementation may be as follows:

callItem.fRes=ret
keyS=addressE & "!" & wB.Name & "!" & sH.Name & "!" & CellAddr.Address
MsgPost.add keyS, callItem A "wake up call" may then be directed towards the cell that contains function reference, known to the message broker from the call Item object being processed. The cell may be made "dirty" (in Excel terminology) which in turn causes Excel to call the function defined in cell formula, as per its primary logical definition. In some releases of Excel the wake up is accomplished by executing RANGE.FORMULA=RANGE.FORMULA method on the RANGE which is the cell containing the reference.

The Message Broker may then return execution of control to Excel (and releases the lock) when and only when there are no more messages in the queue to process. At this stage, the process may dictate that all cells in the workbook which contain function calls are in "calculated" states. Excel goes quiet, and the user gets control of the active worksheet.

Exemplary Implementation of DATA and TABLES in Excel®:

The service layer implementation choices are nearly infinite. One implementation may use a series of VBA techniques to overcome some programmatic limitations of VBA. The storage may be reserved as variable size array of variants, for example: DIM DataT( ) AS VARIANT. Both database and tables maintain logical notion of "rows and columns within rows", with the provision that some columns may contain a reference to multi-value collections (more rows). Language reference in VBA needs to be Array(i)(j)(k) . . . (n), which is possible as a direct syntax. In order to ease the implementation of a priori undetermined number of reference levels, the technique of calling a reference function recursively may be deployed, as follows:

Function MtableGetPut(tableName As String, . . . , ByRef DataT As Variant) As qParm
　<some code>
　c=MtableGetPut(tableName, . . . , DataT(i)(j))
　<more code>
　End Function On the recursive invocation, the data array may "popped up" two levels, and "driven into" row "i" column "j" position. The recursion proceeds during the search until either a search criteria is determined unfulfillable, or the target item is found, at which point the recursion may unwind. DataT being declared as Public Global variable, permits modifications (such as filling empty elements with more array data) from inside these functions. During processing of declaration phases, the program may create a dictionary structure, which defines attributes of every property of the data model (or the dimension of every table).

Data access functions inserted into users workbook, just as in the case of OL functions, immediately pass control to OL standard functions, OL_Get_Prop and MTableGet correspondingly. These perform the following operations. They interpret the provided parameters, each according to its own proper syntactical convention, analyze for errors, report if found. They devise the array of access keys to follow the chain of recursive array for the appropriate number of levels. For each level of recursion, the access key contains (a) the identity of the data field sought by the user, and (b) the value for the key, or array index to be used in lieu of the key. The function's result as returned is determined by the type of object being requested. For a regular field (property) of the data model, as well as for the value of Table cell, the result is actual value of the field or cell sought. For a head of a collection (person, friends, address_history), it is an object Id, or "key". Key is a string which includes all information necessary to obtain the exact location of the sub-array of values for each field (property) which belongs to a particular instance of the collection. For example, a key for PERSON("072-219") is a string [OL KEY]0:1:C:Person|3:1:R:072-219, from which it can be obtained that all fields belonging to this collection instance can be found at location DataStorage(0) (3). This means that CID(Person("072-219")) is found at DataT(0)(3)(0) while Last_Name(Person("072-219")) at DataST(0)(3)(2), etc.

If one of the parameters is a partial key of a parent object, it may be disaggregated into the array of the above structure. For example, a reference to Friends(2,Person(1)) may return the key:

[OL KEY]0:1:C:Person|0:1:R:072-219|12:39:C:Friends|1:39:R:963-173.3

This key may be disaggregated into the access array, providing a starting position DataT(0)(0)(12)(1) to be used for the subsequent search. The disaggregated key also contains the information about the collection itself. This permits resolving any ambiguity of references. For example, the property "Start Year" exists in multiple collections—it is a key property of "Address History" collection for each Person, it is also found in Schools, Jobs, Summer Schools, etc. Last Name is a property of Person, but since Friends have same properties as Persons, the reference Last_Name is inherently ambiguous.

A proper property reference, however, is a fully cascade of functions (coded directly or through intermediate cells), as in Start_Year(Address_History(2,Person("072-219")), or Last_Name(Friends("963-173.3", Person("072-219"))). Since the functions may be called in "inside-out" order by Excel, OL_Get_Prop function may receive the appropriate collection key as one of its inputs. It may therefore recognize which instance of the property among the multiple possibilities it should treat as the target of the query.

If the value of the sought property or table cell is not found (either because the parent collection does not have the instance, or the property contains NULL), the function causes Excel to display #N/A error value in the cell, by using Excel CVerr(vbNA) standard call documented in Microsoft Office Excel 2007 Reference. Upon receiving control back from OL_GetProp or MTableGet, the part of the code which had been inserted into the user's workbook may complete the logic by presenting the returned value back to Excel in the proper datatype. An exemplary code implementation may be as follows:

If isNumeric(kRet)=True Then Last_Name=CDbl(kRet) Else_
If isDate(kRet)=True Then Last_Name=CDate(kRet) Else_
　Last_Name=kRet As can be appreciated, the present disclosure permits a business domain specialist working in a spreadsheet to declare an arbitrary section of his or her model coded in the spreadsheet as a new command now callable from anywhere in the spreadsheet without having to call on the services of anyone with the programming language skills. The new command is available to the person working in the spreadsheet, as well to the members of the person's team, when he or she is operating in the team environments.

Artisans would appreciate that the present disclosure can benefit individuals and project teams engaged in development of software applications and components of software applications which deal with analytically sophisticated problems, such as:

a) Risk rating applications (lending, insurance, rating agencies)

b) Computation of required risk premiums (insurance, lending)

c) Evaluation of operational risk, risk monitoring, and optimization d) Valuation of assets and portfolios e) Risk adjusted valuation of projects, activities, project and activities portfolios f) Optimization of above portfolios g) Corporate performance optimization h) others The present disclosure may be applicable in the more generic domain of Business Intelligence discipline, delivering unique benefits to individuals and teams engaged in development and maintenance of analytically more sophisticated class of reports, such as management reporting and dashboards. In some cases, it may be useful in maintenance of statutory reports as well.

The lingua franca of business decision maker is a spreadsheet. The language of software application is a combination of database definitions and data management methods, object models, functions and procedures, user interfaces—all written in a plethora of programming and modeling languages available at any given point in time and constantly evolving.

In one embodiment, the processor 20 may be programmed to translate from a spreadsheet language to a software language using the translation module 25. It may also define the method and the process of translation. It defines the method and scope of applicable backward translation (from software into spreadsheet).

In one practical implementation, the processor 20 may be programmed to evaluate general extensions in a specific spreadsheet language, for example, Microsoft Excel®, using one of the published and fully Microsoft-supported Excel extension frameworks. The present disclosure can be implemented to other spreadsheet products as well.

One commercial implementation of the present disclosure plans to deliver a working translation between the Excel language and an Open Source software application backbone, such as OpenL. The resulting technology may allow business specialists in the target domains to manufacture new additional components of existing software applications (such as, for example, adding a premium rates management component to an insurance business process management application), as well as to create a whole new application (such as, for example, a portfolio performance measurement dashboard for a private equity fund), with greatly reduced and in many cases completely eliminated need for slow and costly involvement of IT personnel.

In one embodiment, the declaration command can be implemented with other spreadsheet products, especially spreadsheet products that can be extended by third parties. While some products (notably Excel) publish an open extension framework which would permit third parties to implement embodiments of the invention, others can be extended by their manufacturers.

As is understood by a person skilled in the art, the syntax described herein is for illustration purpose only. Based on the "grammar" of the spreadsheet language extension described here, the "syntax" is open to implementers to decide. For example, while the use of keywords "DECLARE FUNCTION" to specify the user's directive to create a new function in Excel is described herein, any other combination of keywords expressing the same directive can be used.

As can be appreciated, the present disclosure may be utilized for the modern software environments, which include Object Modeling layer as a prerequisite dependency. The present disclosure may also be used in archaic software environments (such as COBOL-based systems built during pre-MDA or even pre-Relational epochs).

In this description, various functions and operations may be described as being performed by or caused by software code to simplify description. However, those skilled in the art may recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

The computer-readable media may store the instructions. In general, a tangible machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others may be apparent to those of ordinary skill in the art and so do not present an exhaustive list of alternatives. Moreover, it should be recognized that the stages could be implemented in hardware, firmware, software or any combination thereof.

The disclosure includes methods and apparatuses which perform these methods, including data processing systems which perform these methods, and computer readable media containing instructions which when executed on data processing systems cause the systems to perform these methods.

While the methods and systems have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention both independently and as an overall system and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these.

Particularly, it should be understood that as the disclosure relates to elements of the invention, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this invention is entitled.

It should be understood that all actions may be expressed as a means for taking that action or as an element which causes that action.

Similarly, each physical element disclosed should be understood to encompass a disclosure of the action which that physical element facilitates.

In this regard it should be understood that for practical reasons and so as to avoid adding potentially hundreds of claims, the applicant has presented claims with initial dependencies only.

To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, the use of the transitional phrase "comprising" is used to maintain the "open-end" claims herein, according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

What is claimed is:

1. A method for defining a new command in a spreadsheet application, the method comprising:
    receiving a declaration command in a first spreadsheet cell in the spreadsheet application, the declaration command identifying:
        a command name for the new command,
        at least one parameter of the new command, wherein the declaration command includes an identifier of an input cell in the spreadsheet application for the parameter of the new command; and
        an identifier of an output cell in the spreadsheet application, wherein when the new command is invoked, in a second spreadsheet cell in the spreadsheet application, with a first value supplied as the parameter of the new command, a result of the new command as invoked in the second spreadsheet cell corresponds to a second value in the output cell evaluated with an input identified by the first value being supplied to the input cell in the spreadsheet application.

2. The method of claim 1, further comprising generating, in a predetermined programming language, a fragment of code corresponding to a function of the new command declared using a spreadsheet language.

3. A non-transitory computer readable medium having stored thereon a set of instructions, which when executed by a computer having a processor and a memory, causes the computer to perform operations comprising:
    receiving a declaration command in a first spreadsheet cell of a spreadsheet application, the declaration command defining a command name as a new command callable in a second spreadsheet cell, the declaration command identifying:

at least one parameter of the new command, wherein the declaration command identifies an input cell in the spreadsheet application for the parameter of the new command; and an output cell in the spreadsheet application, wherein when the new command is called, in the second spreadsheet cell in the spreadsheet application, with a first value supplied as the parameter of the new command, a result of the new command as called in the second spreadsheet cell corresponds to a second value in the output cell evaluated with an input identified by the first value being supplied to the input cell in the spreadsheet application; and executing the declaration command in the first spreadsheet cell to create the new command in the spreadsheet application.

4. The computer readable medium of claim 3, wherein the operations further comprise:

generating in a predetermined programming language a fragment of code corresponding to a function of the new command declared using a spreadsheet language.

5. A system for executing a new command in a spreadsheet application, the system comprising:

a storage device to store code instructions for implementing a declaration command; and a processor programmed to:

receive code instructions for invoking the declaration command in a first spreadsheet cell, wherein the declaration command is invoked in the first spreadsheet with a command name for the new command;

at least one first parameter for the declaration command, the first parameter identifying an input cell in the spreadsheet application;

a second parameter for the declaration command, the second parameter identifying an output cell in the spreadsheet application;

execute code instructions for invoking the command name in a second spreadsheet cell to execute the new command with a third parameter provided in the second spreadsheet cell, wherein a result of invoking the command name in the second spreadsheet cell corresponds to a value of the output cell evaluated with an input identified by the third parameter being supplied to the input cell.

6. The system of claim 5, wherein the processor is programmed to translate the new command declared in a spreadsheet language to a fragment of code in a predetermined programming language.

7. The system of claim 5, wherein the processor is programmed to call the declaration command and the command name in a spreadsheet language.

8. The system of claim 5, wherein the third parameter provided in the second spreadsheet cell is an identifier of a third spreadsheet cell of the spreadsheet application.

9. The system of claim 8, wherein the input identified by the third parameter is a value in the spreadsheet third cell of the spreadsheet application.

10. The method of claim 1, wherein the first value supplied as the parameter of the new command is an identifier of a third spreadsheet cell of the spreadsheet application.

11. The method of claim 10, wherein the input identified by the first value is a value in the third spreadsheet cell of the spreadsheet application.

12. The computer readable medium of claim 3, wherein the first value supplied as the parameter of the new command is an identifier of a third spreadsheet cell in the spreadsheet application.

13. The computer readable medium of claim 12, wherein the input identified by the first value is a value in the third spreadsheet cell of the spreadsheet application.

14. The computer readable medium of claim 3, wherein the declaration command includes an identifier of the input cell as a parameter used to invoke the declaration command in the first spreadsheet cell.

15. The computer readable medium of claim 14, wherein the declaration command includes an identifier of the output cell as a parameter used to invoke the declaration command in the first spreadsheet cell.

16. The computer readable medium of claim 15, wherein the declaration command is executed in the first spreadsheet cell with the identifier of the input cell, the identifier of the output cell, and the command name for the new command as parameters of the declaration command.

17. The method of claim 1, further comprising:

executing the declaration command received in the first spreadsheet cell to make the new command callable in spreadsheet cells in the spreadsheet application, including the second spreadsheet cell.

18. The method of claim 17, wherein the executing of the declaration command comprises:

generating a fragment of code in a predetermined programming language executable in the spreadsheet application when the new command is called, wherein a function of the code is defined by content in a spreadsheet language provided in one or more spreadsheet cells in the spreadsheet application, including the output cell.

19. The method of claim 17, wherein the function of the code is equal to a resulting value of the output cell as a function of at least one input, provided as the at least one parameter of the new command, in a way applied to the one or more spreadsheet cells in the spreadsheet application in accordance with the declaration command.

20. The computer readable medium of claim 4, wherein the declaration command identifies mapping between a plurality of parameters of the new command and a plurality of input cells in the spreadsheet application; and the code is generated to have a function in accordance with a functional relation between the output cell and the plurality of input cells as defined by content in a plurality of cells of the spreadsheet application.

* * * * *